(12) United States Patent
Oh et al.

(10) Patent No.: US 12,542,972 B2
(45) Date of Patent: Feb. 3, 2026

(54) CAMERA DEVICE

(71) Applicant: LG INNOTEK CO., LTD., Seoul (KR)

(72) Inventors: Jung Seok Oh, Seoul (KR); Jung Cheol Kim, Seoul (KR); Hyun Soo Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 21 days.

(21) Appl. No.: 18/562,402

(22) PCT Filed: May 13, 2022

(86) PCT No.: PCT/KR2022/006894
§ 371 (c)(1),
(2) Date: Nov. 20, 2023

(87) PCT Pub. No.: WO2022/245060
PCT Pub. Date: Nov. 24, 2022

(65) Prior Publication Data
US 2024/0244323 A1    Jul. 18, 2024

(30) Foreign Application Priority Data

May 21, 2021  (KR) .................. 10-2021-0065815
Nov. 26, 2021 (KR) .................. 10-2021-0166226

(51) Int. Cl.
*H04N 23/68*     (2023.01)
*G03B 13/36*     (2021.01)
(Continued)

(52) U.S. Cl.
CPC .......... *H04N 23/687* (2023.01); *G03B 13/36* (2013.01); *H04N 23/54* (2023.01); *H04N 23/53* (2023.01); *H04N 23/55* (2023.01)

(58) Field of Classification Search
CPC ............ G03B 13/36; G03B 2205/0038; G03B 2205/0069; G03B 30/00; G03B 5/00;
(Continued)

(56) References Cited

U.S. PATENT DOCUMENTS 10,241,240 B1 * 3/2019 Choi ..................... G02B 3/14
11,846,767 B2 * 12/2023 Park ...................... G02B 7/09
(Continued)

FOREIGN PATENT DOCUMENTS

CN    112005167 A   11/2020
EP    3 817 362 A1   5/2021
(Continued)

OTHER PUBLICATIONS

International Search Report dated Aug. 25, 2022 in International Application No. PCT/KR2022/006894.
(Continued)

*Primary Examiner* — Amy R Hsu
(74) *Attorney, Agent, or Firm* — Saliwanchik, Lloyd & Eisenschenk

(57) ABSTRACT

The present embodiment relates to a camera device comprising: a first substrate; a base disposed on the first substrate; a second substrate spaced apart from the first substrate; an image sensor electrically connected to the second substrate; a holder disposed on the second substrate; a driving unit for moving the image sensor in a direction perpendicular to the optical axis direction with respect to the first substrate; and a connection substrate electrically connecting the first substrate and the second substrate, wherein the connection substrate comprises a first part fixed to the holder and a second part fixed to the base.

20 Claims, 19 Drawing Sheets

(51) Int. Cl.
*H04N 23/53* (2023.01)
*H04N 23/54* (2023.01)
*H04N 23/55* (2023.01)

(58) Field of Classification Search
CPC .... H02K 41/0356; H04N 23/53; H04N 23/54; H04N 23/55; H04N 23/57; H04N 23/687
See application file for complete search history.

(56) References Cited

U.S. PATENT DOCUMENTS

| 12,075,142 | B2* | 8/2024 | Miller | H05K 1/0281 |
| 2021/0092297 | A1* | 3/2021 | Smyth | H04N 23/54 |
| 2021/0258491 | A1* | 8/2021 | Park | H04N 23/57 |
| 2022/0286591 | A1* | 9/2022 | Seo | H04N 23/54 |

FOREIGN PATENT DOCUMENTS

| KR | 10-2010-0066809 A | 6/2010 |
| KR | 10-2018-0033959 A | 4/2018 |
| KR | 10-2018-0047724 A | 5/2018 |
| KR | 10-2019-0018222 A | 2/2019 |
| KR | 10-2019-0089600 A | 7/2019 |
| KR | 10-2019-0091719 A | 8/2019 |
| WO | 2022/015746 A1 | 1/2022 |

OTHER PUBLICATIONS

Supplementary European Search Report dated Mar. 31, 2025 in European Application No. 22804915.1.
Office Action dated Oct. 28, 2025 in Taiwanese Application No. 111118419.

\* cited by examiner

CAMERA DEVICE

CROSS-REFERENCE TO RELATED APPLICATIONS

This application is the U.S. national stage application of International Patent Application No. PCT/KR2022/006894, filed May 13, 2022, which claims the benefit under 35 U.S.C. § 119 of Korean Application Nos. 10-2021-0065815, filed May 21, 2021; and 10-2021-0166226, filed Nov. 26, 2021; the disclosures of each of which are incorporated herein by reference in their entirety.

TECHNICAL FIELD

The present embodiment relates to a camera device.

BACKGROUND ART

A camera device is a device that photographs a subject as a picture or video, and is being installed in optical devices such as smartphones, drones, and vehicles.

In order to improve image quality, a camera device is required to have a handshake correction (optical image stabilization, OIS) function that corrects image shake caused by user movement.

In the camera device, the handshake correction function is performed by moving the lens in a direction perpendicular to the optical axis. However, as the diameter of the lens increases in accordance with the recent trend toward high pixel density, the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that performs handshake correction by moving the image sensor.

The present embodiment is intended to provide a camera device that drives the image sensor in three axes: x-axis shift, y-axis shift, and z-axis rolling.

Technical Solution

The camera device according to the present embodiment comprises: a first substrate; a base being disposed on the first substrate; a second substrate being spaced apart from the first substrate; an image sensor being electrically connected to the second substrate; a holder being disposed on the second substrate; a driving unit for moving the image sensor in a direction perpendicular to an optical axis direction with respect to the first substrate; and a connection substrate electrically connecting the first substrate and the second substrate, wherein the connection substrate may comprise a first part being fixed to the holder, and a second part being fixed to the base.

The holder may comprise a protruding part being formed on an outer edge of an upper surface of the holder, and the first part of the connection substrate may be fixed to the protruding part of the holder with an adhesive.

The base may comprise a protruding part being protruded from an upper surface of the base, and the second part of the connection substrate may be fixed to the protruding part of the base with an adhesive.

The holder may comprise a groove being formed on an outer edge of a lower surface of the holder, and the connection substrate may comprise a third part being disposed in the groove of the holder.

The connection substrate comprises a connection part being connected to the second substrate, an extension part being extended from the connection part, and a terminal part being extended from the extension part and comprising a terminal, wherein connection part comprises a portion being disposed perpendicular to the optical axis direction, and each of the extension part and the terminal part may comprise a portion being disposed parallel to the optical axis direction.

The first part of the connection substrate may be formed on the extension part, and the second part of the connection substrate may be formed on the terminal part.

The connection part may comprise a portion being bent in the optical axis direction and being fixed to the holder, and the extension part may comprise a portion being bent in the direction perpendicular to the optical axis direction.

The connection substrate may comprise first and second connection substrates being spaced apart from each other; and the first and second connection substrates may comprise an optical axis and be symmetrically disposed with respect to an imaginary plane perpendicular to an outer side surface of the holder.

At least a portion of the third part of the connection substrate may be bent roundly.

The holder comprises first and second side surfaces being disposed opposite to each other, and third and fourth side surfaces being disposed opposite to each other; and the connection substrate may be fixed to the first and second side surfaces and spaced apart from the third and fourth side surfaces.

The base comprises first and second side surfaces being disposed at positions corresponding to the first and second side surfaces of the holder, and third and fourth sides being disposed at positions corresponding to the third and fourth side surfaces of the holder; and the connection substrate may be fixed to the third and fourth side surfaces of the base and spaced apart from the first and second side surfaces of the base.

The base may comprise a protruding part being extended upward from the first and second side surfaces of the base and being disposed to be overlapped in a direction perpendicular to the optical axis direction on an outer side of the connection substrate.

The driving unit may comprise a coil being disposed on an upper surface of the holder and a magnet being disposed at a position corresponding to the coil.

The camera device may comprise: a lens being disposed at a position corresponding to the image sensor; a bobbin coupled to the lens; and a coil and a magnet for moving the lens in the optical axis direction.

The first part of the connection substrate may be in contact with the holder.

The camera device according to the present embodiment comprises: a fixed part comprising a first substrate and a base being disposed on the first substrate; a first moving part comprising a lens; a second moving part comprising a second substrate, a holder being disposed on the second substrate, and an image sensor; a first driving unit for moving the first moving part in an optical axis direction with respect to the fixed part; a second driving unit for moving the second moving part in a direction perpendicular to the optical axis direction with respect to the fixed part; and a connection substrate electrically connecting the first substrate and the second substrate, wherein the connection substrate may comprise a first part being fixed to the holder, and a second part being fixed to the base.

The holder may comprise a protruding part being formed on an outer edge of an upper surface of the holder, and the first part of the connection substrate may be fixed to the protruding part of the holder.

The base may comprise a protruding part being protruded from an upper surface of the base, and the second part of the connection substrate may be fixed to the protruding part of the base.

The holder may comprise a groove being formed on an outer edge of a lower surface of the holder, and the connection substrate may comprise a third part being disposed in the groove of the holder.

An optical device according to the present embodiment may comprise: a main body; a camera device being disposed in the main body; and a display being disposed in the main body and outputting a video or an image photographed by the camera device.

The camera device according to the present embodiment comprises: a fixed part; a moving part containing an image sensor; a driving unit for moving the moving part in a direction perpendicular to an optical axis direction with respect to the fixed part; and a connection substrate connecting the fixed part and the moving part, wherein the connection substrate may comprise a first part being fixed to the moving part, and a second part being fixed to the fixed part.

The camera device according to the present embodiment comprises: a fixed part; a moving part comprising an image sensor; a driving unit for moving the moving part in a direction perpendicular to an optical axis direction with respect to the fixed part; and a connection substrate connecting the fixed part and the moving part, wherein the connection substrate comprises a bent portion, and wherein the connection substrate may be fixed to the moving part so that the shape of the bent portion is maintained.

The camera device according to the present embodiment comprises: a fixed part with first substrate; a first moving part moving with respect to the fixed part; a first driving unit for moving the first moving part in an optical axis direction; a second substrate being disposed between the first moving part and the first substrate; a second driving unit for moving the second substrate in a direction perpendicular to the optical axis direction; and a connection substrate connecting the first substrate and the second substrate, wherein the connection substrate may comprise a first region being connected to the second substrate and being bent in an optical axis direction, a second region being extended from the first region, and a third region being bent in a direction perpendicular to the optical axis direction in the second region.

The connection substrate may comprise a connection part comprising the first region, and an extension part comprising the second region and the third region.

The connection substrate may comprise a terminal part being connected to the extension part and comprising a terminal.

The second substrate and the connection substrate may be integrally formed.

The second substrate may be spaced apart from the fixed part in a direction perpendicular to the optical axis direction and the optical axis direction.

The camera device according to the present embodiment comprises: a fixed part; a first moving part moving in an optical axis direction with respect to the fixed part; a second moving part moving in a direction perpendicular to the optical axis direction with respect to the fixed part; and a flexible substrate connecting the fixed part and the second moving part, wherein the flexible substrate may comprise a connection part being connected to the second moving part, an extension part being extended from the connection part, and a terminal part being connected to the extension part and comprising a terminal.

The camera device according to the present embodiment comprises: a first substrate; a bobbin being disposed on the first substrate; a second substrate being disposed between the bobbin and the first substrate and moving in a direction perpendicular to an optical axis direction; and a connection substrate connecting the first substrate and the second substrate, wherein the connection substrate comprises a connection part being connected to the second substrate, and an extension part being extended from the connection part, wherein the connection part comprises a first bending region being bent in an optical axis direction, and the extension part may comprise a second bending region being bent in a direction perpendicular to the optical axis direction.

The camera device according to the present embodiment comprises: a fixed part with first substrate; a first moving part being disposed within the fixed part and comprising a lens; a second moving part being disposed between the first moving part and the first substrate and comprising an image sensor; a first driving unit for moving the first moving part in an optical axis direction; a second driving unit for moving the second moving part in a direction perpendicular to the optical axis direction; and a connection substrate connecting the first substrate and the second moving part, wherein the connection substrate may have flexibility at least in part.

The second moving part comprises a second substrate that is electrically connected to the image sensor and moves integrally, wherein the connection substrate comprises a first part being coupled to the first substrate, a second part being coupled to the second substrate, and a third part connecting the first part and the second part, and wherein the third part may be disposed parallel to the optical axis at least in part.

The second part of the connection substrate may be disposed parallel to the second substrate in at least a portion, and the third part of the connection substrate may be disposed perpendicular to the second part in at least a portion.

The second substrate comprises: a first side surface and a second side surface being disposed opposite to each other; and a third side surface and a fourth side surface being disposed opposite to each other, wherein the second part of the connection substrate is coupled to the first side surface and the second side surface of the second substrate, and wherein the first part of the connection substrate may be coupled to a portion of the first substrate corresponding to the third side surface and the fourth side surface of the second substrate.

The third part of the connection substrate may be bent roundly in a portion corresponding to a corner of the second substrate.

The connection substrate may comprise two connection substrates being spaced apart from each other and being formed symmetrically.

The camera device comprises a sensor substrate being coupled to the second substrate, the image sensor is disposed on the sensor substrate, and the second substrate may comprise a terminal being disposed on a lower surface of the second substrate and being coupled to a terminal of the sensor substrate.

The camera device may comprise a sensor base being disposed on the sensor substrate; and a filter being disposed on the sensor base, wherein the image sensor may be disposed between the sensor substrate and the sensor base.

The first driving unit comprises a first coil, the second driving unit comprises a second coil, and the first driving unit and the second driving unit may comprise a driving magnet being commonly used for interaction between the first coil and the second coil.

The second moving part may comprise a holder, the driving magnet may be disposed on the fixed part, the first coil may be disposed on the first moving part, and the second coil may be disposed on the holder.

The camera device may comprise: a sensing magnet and a correction magnet being disposed on opposite sides of the first moving part; a sensing substrate being coupled to the first substrate; and a sensor being disposed on the sensing substrate and being disposed at a position corresponding to the sensing magnet.

The camera device comprises an elastic member connecting the fixed part and the first moving part, the elastic member comprises an upper elastic member and a lower elastic member being disposed below the upper elastic member, and the lower elastic member may comprise two lower elastic units being spaced apart from each other to electrically connect the sensing substrate and the first coil.

The camera device may comprise a cover member being coupled to the fixed part and covering the first moving part, wherein the first moving part may comprise a bobbin being coupled to the lens.

The second driving unit moves the second moving part in a first direction perpendicular to the optical axis direction, moves in a second direction perpendicular to the optical axis direction and the first direction, and may rotate around the optical axis.

The optical device according to the present embodiment may comprise: a main body; a camera device being disposed in the main body; and a display being disposed on the main body and outputting a video or an image photographed by the camera device.

The camera device according to the present embodiment comprises: a first substrate; a base being disposed in the first substrate; a housing being fixed to the base; a bobbin being disposed inside the housing; a magnet being disposed in the housing; a first coil being disposed on the bobbin at a position corresponding to the magnet; a second substrate being disposed between the bobbin and the first substrate; a second coil being disposed on the second substrate at a position corresponding to the magnet; and a connection substrate connecting the first substrate and the second substrate, wherein the connection substrate may have flexibility at least in part.

The camera device may comprise a lens being coupled to the bobbin; and an image sensor being electrically connected to the second substrate and moving integrally with the second substrate.

The camera device according to the present embodiment comprises: a bobbin; a second substrate being disposed below the bobbin and moving in a direction perpendicular to an optical axis direction; and a connection substrate being connected to the second substrate, wherein the connection substrate comprises a connection part being connected to the second substrate, and an extension part being extended from the connection part, wherein the connection part comprises a first bending region being bent in the optical axis direction, and wherein the extension part may comprise a second bending region being bent in a direction perpendicular to the optical axis direction.

The camera device may comprise a first substrate, wherein the second substrate may be disposed between the bobbin and the first substrate.

The camera device may comprise: a lens being coupled to the bobbin; and an image sensor being electrically connected to the second substrate.

The camera device comprises: a first driving unit for moving the bobbin in an optical axis direction; and a second driving unit for moving the second substrate in a direction perpendicular to the optical axis direction.

Advantageous Effects

Through the present embodiment, the handshake correction function can be performed by moving the image sensor.

In addition, through the common structure of the driving magnet, the number of magnets to be adopted is reduced, material costs are reduced, and the height dimension of the camera device can be reduced.

In addition, it is possible to increase assembly and productivity by implementing the support shape of the connection substrate with minimal bending.

In addition, by using an FPCB as an interposer, it is possible to perform both energization and movement support of the image sensor.

BRIEF DESCRIPTION OF DRAWINGS

FIG. 27 is a diagram for explaining driving in which the image sensor of a camera device according to the present embodiment is shifted along the x-axis. FIG. 28 is a diagram for explaining driving in which an image sensor of a camera device according to the present embodiment is shifted along the y-axis. FIG. 29 is a view for explaining the driving of an image sensor of a camera device according to the present embodiment is rolled around the z-axis.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a camera device according to the present embodiment will be described with reference to the drawings.

Figure 1:
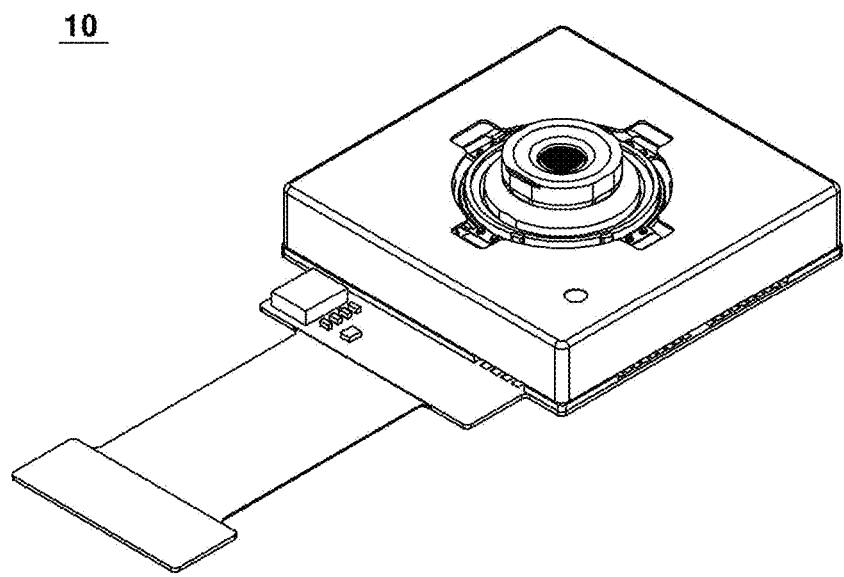
FIG. 1 is a perspective view of a camera device according to the present embodiment.
Figure 2:
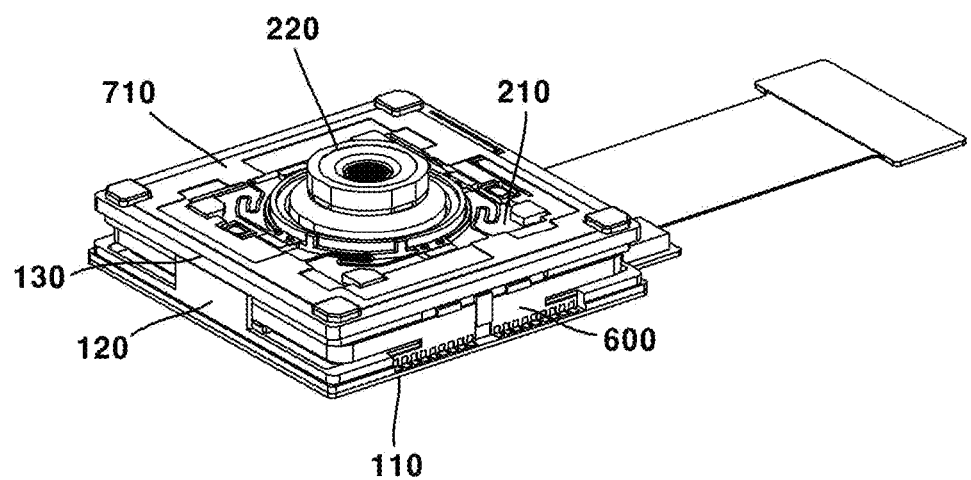
FIG. 2 is a perspective view of a state in which the cover member is omitted from the camera device according to the present embodiment.
Figure 3:
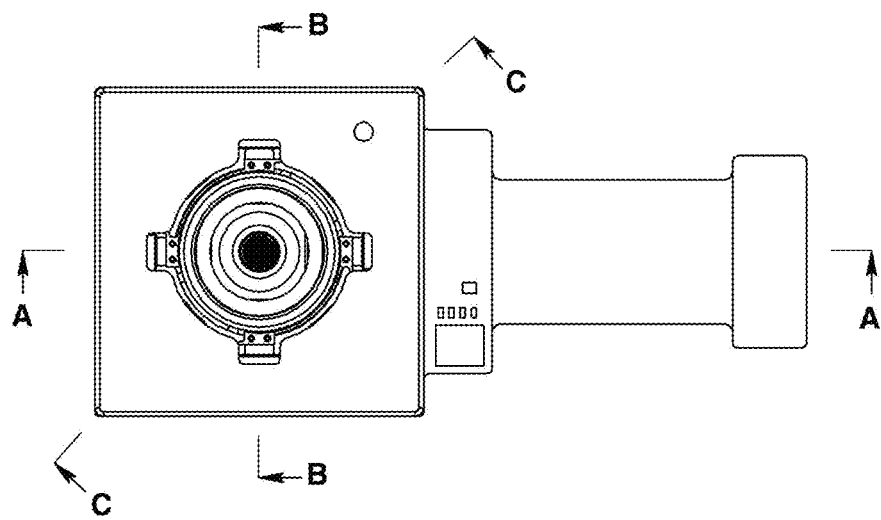
FIG. 3 is a plan view of a camera device according to the present embodiment.
Figure 4:
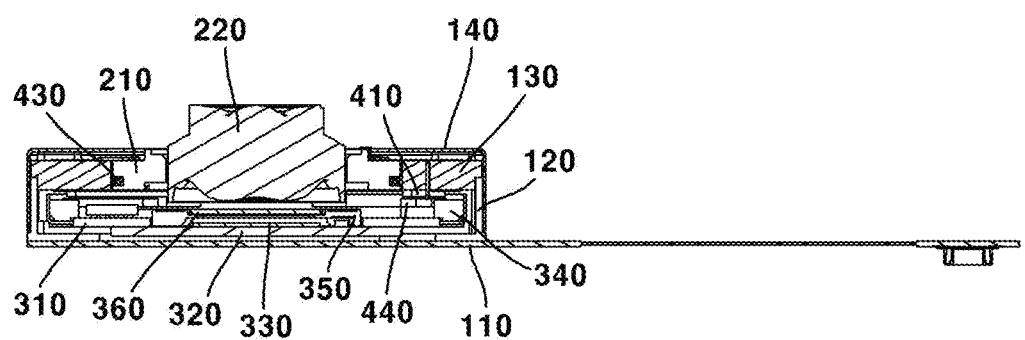
FIG. 4 is a cross-sectional view taken along line A-A of FIG. 3.
Figure 5:
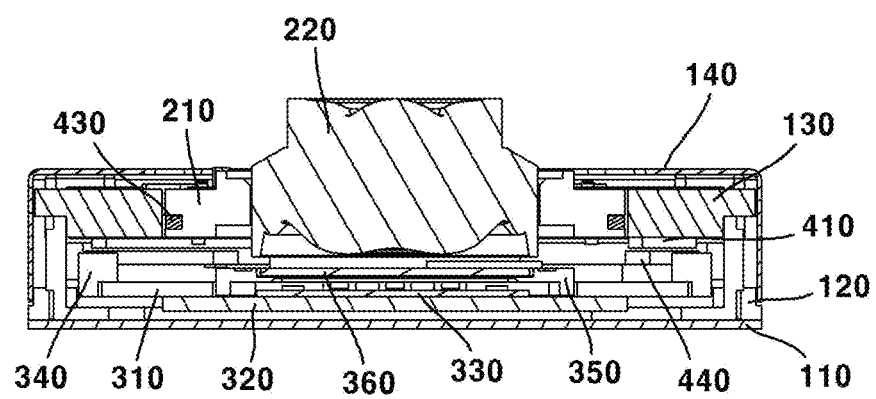
FIG. 5 is a cross-sectional view taken along line B-B of FIG. 3.
Figure 6:
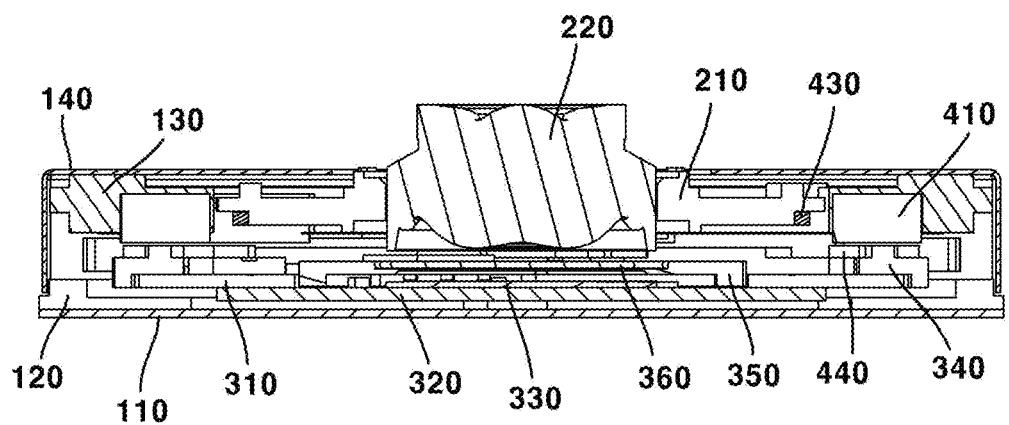
FIG. 6 is a cross-sectional view taken along line C-C of FIG. 3.
Figure 7:
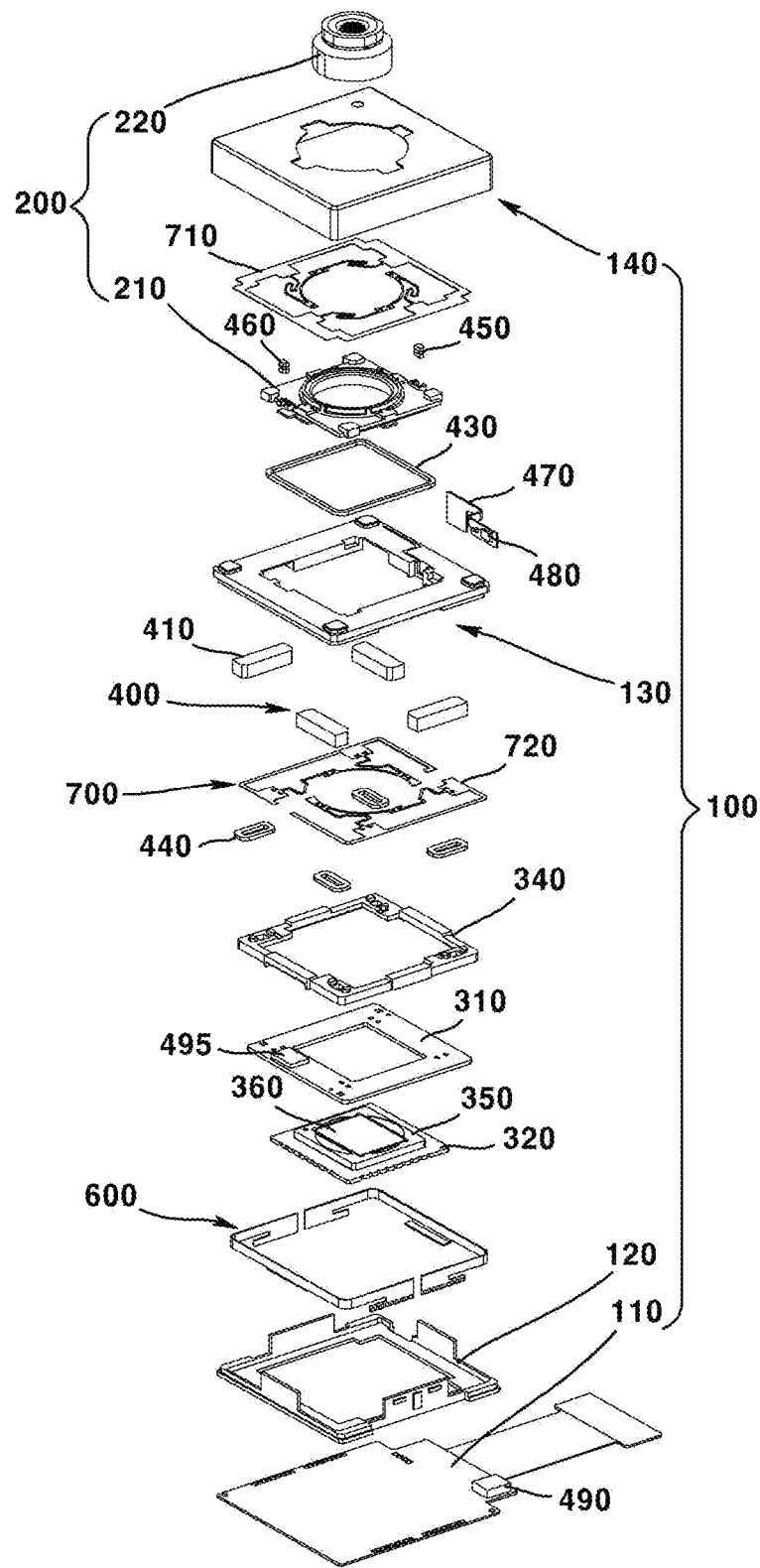
FIG. 7 is an exploded perspective view of a camera device according to the present embodiment.
Figure 8:
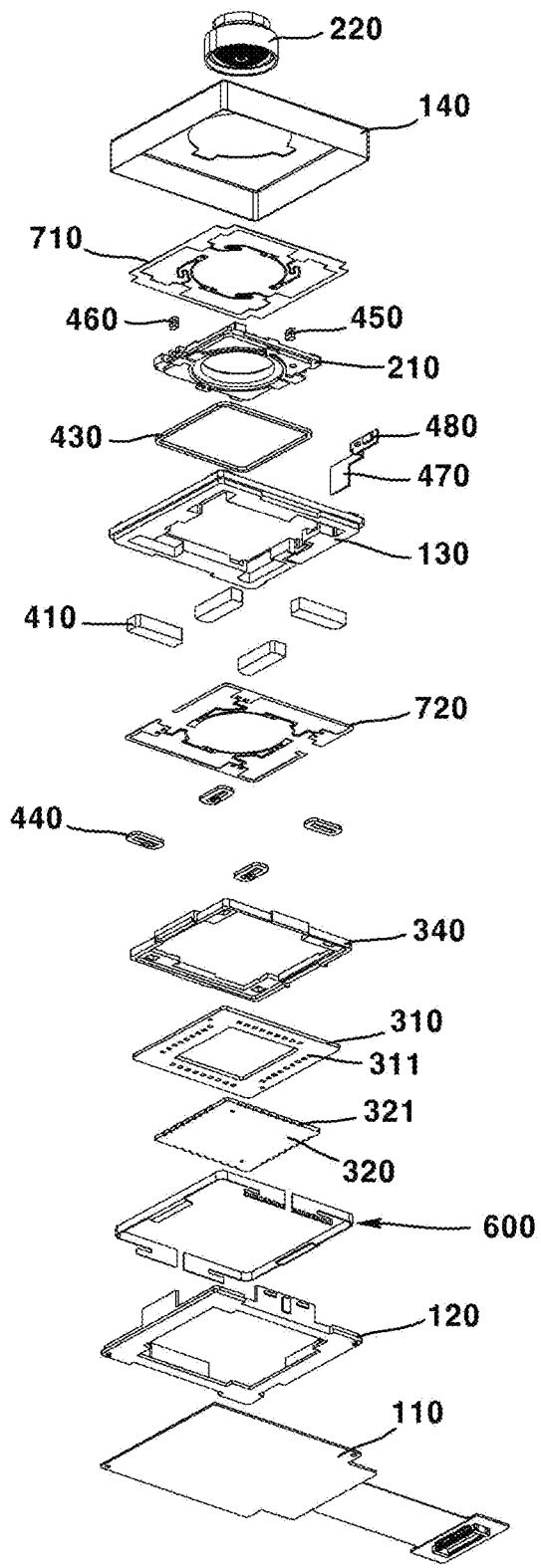
FIG. 8 is an exploded perspective view of a camera device according to the present embodiment viewed from a different direction from FIG. 7.
Figure 9:
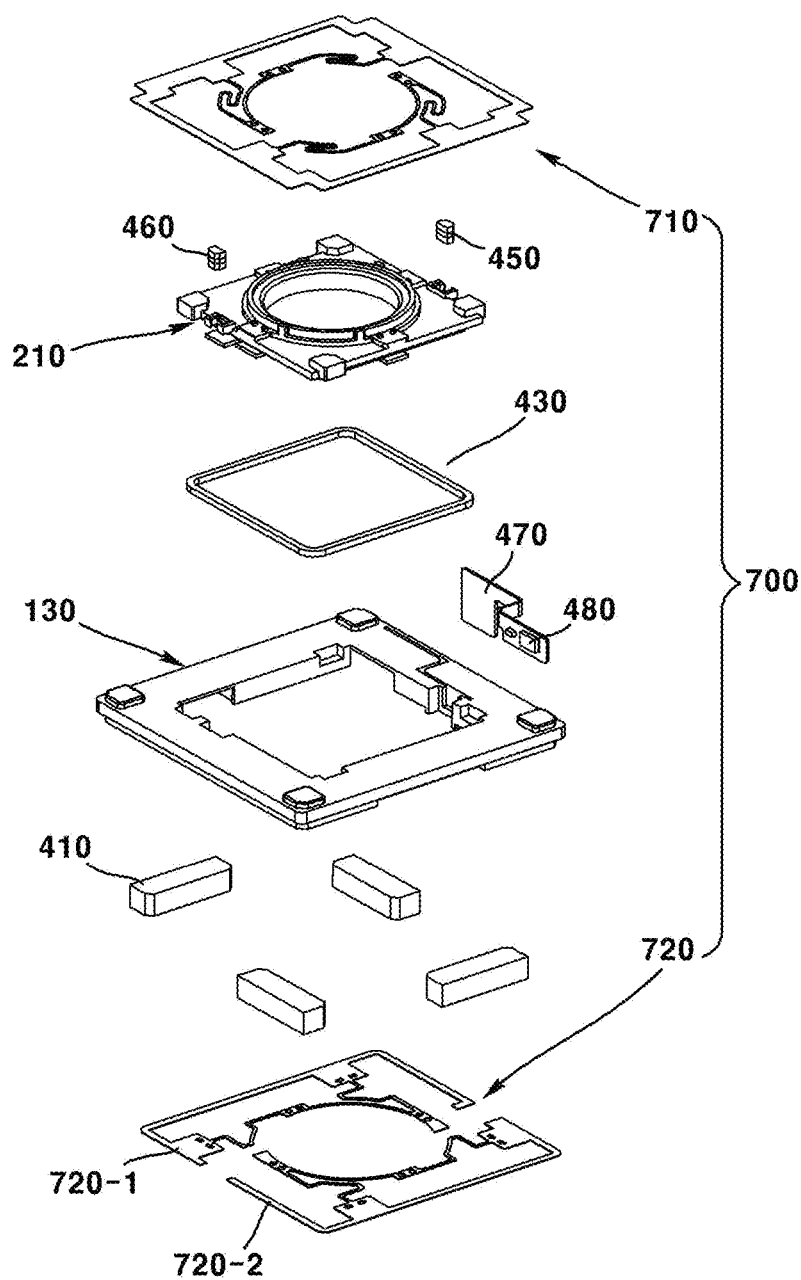
FIG. 9 is an exploded perspective view of a first moving part and related configuration of a camera device according to the present embodiment.
Figure 10:
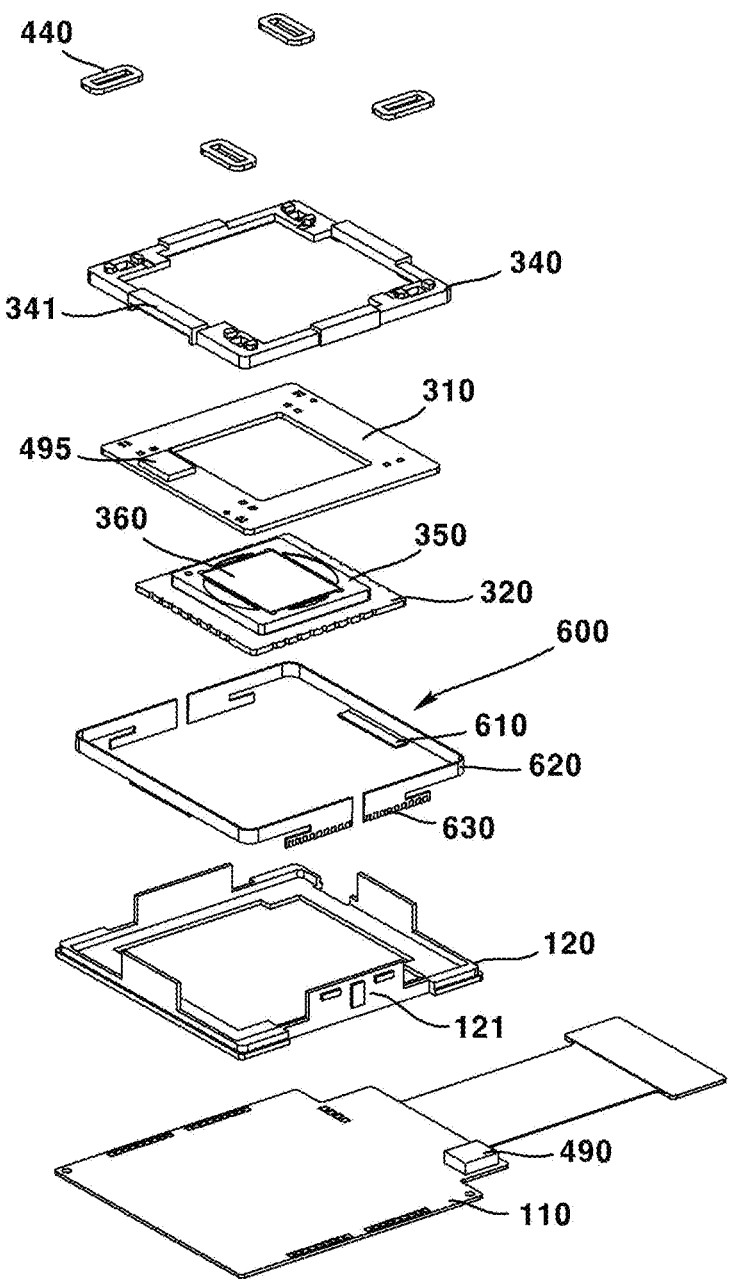
FIG. 10 is an exploded perspective view of a second moving part and related configuration of a camera device according to the present embodiment.
Figure 11:
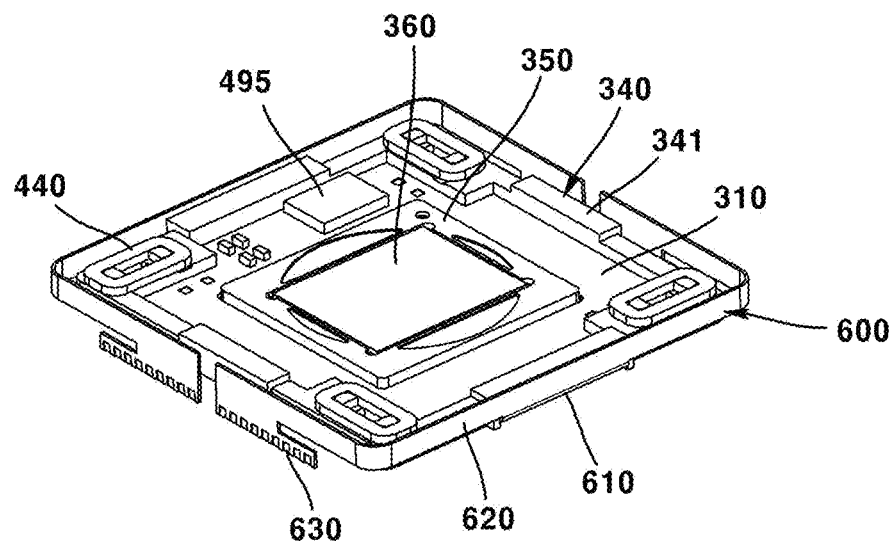
FIG. 11 is a perspective view of a second moving part and a connection substrate of a camera device according to the present embodiment.
Figure 12:
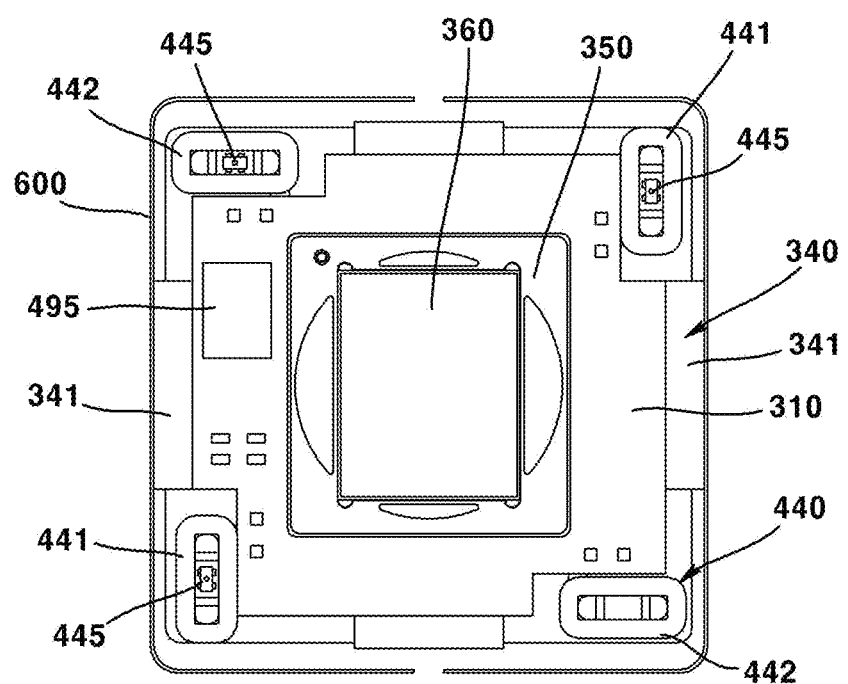
FIG. 12 is a plan view of a second moving part and a connection substrate of a camera device according to the present embodiment.
Figure 13:
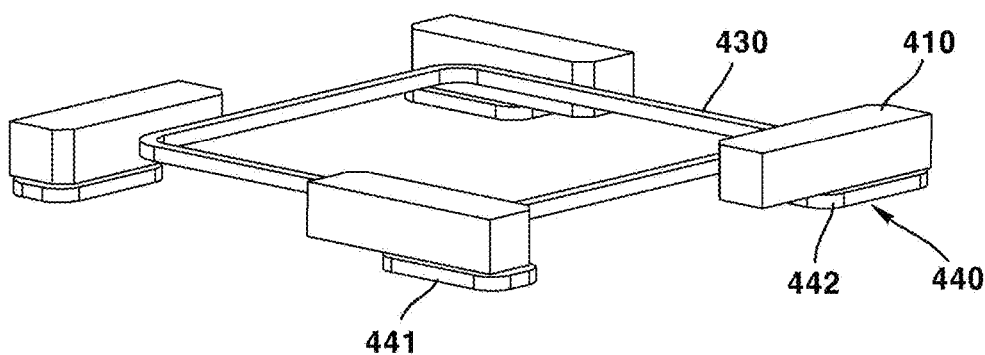
FIG. 13 is a perspective view of a magnet and a coil of a camera device according to the present embodiment.
Figure 14:
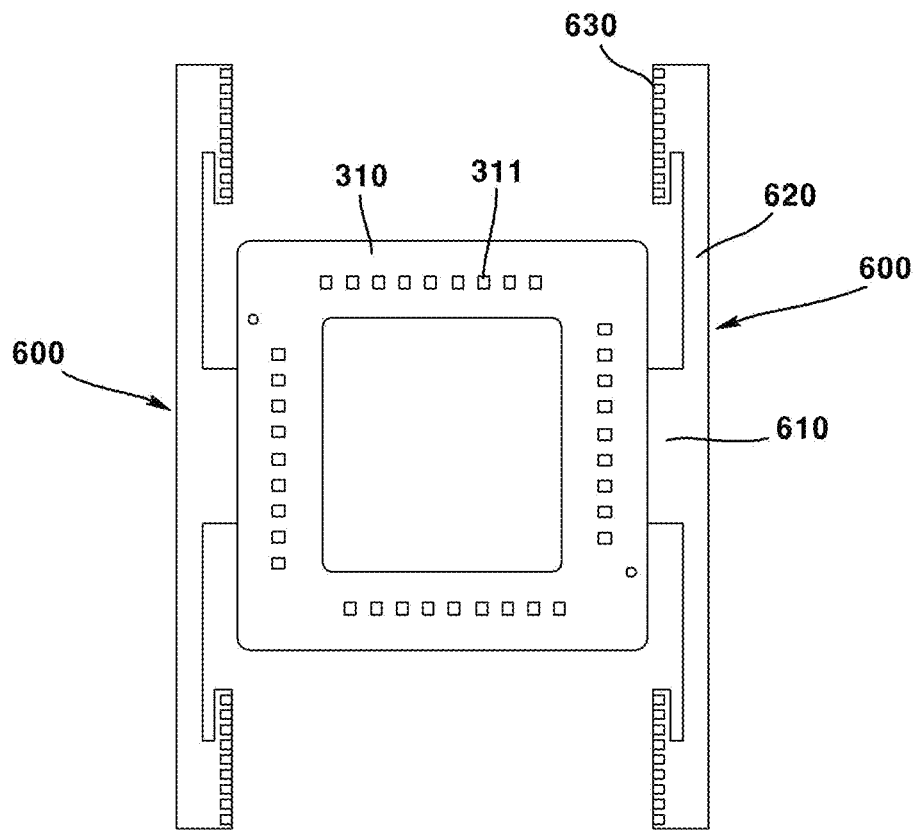
FIG. 14 is a plan view illustrating the connection of a second substrate and a connection substrate of a camera device according to the present embodiment in a state before the connection substrate is bent.
Figure 15:
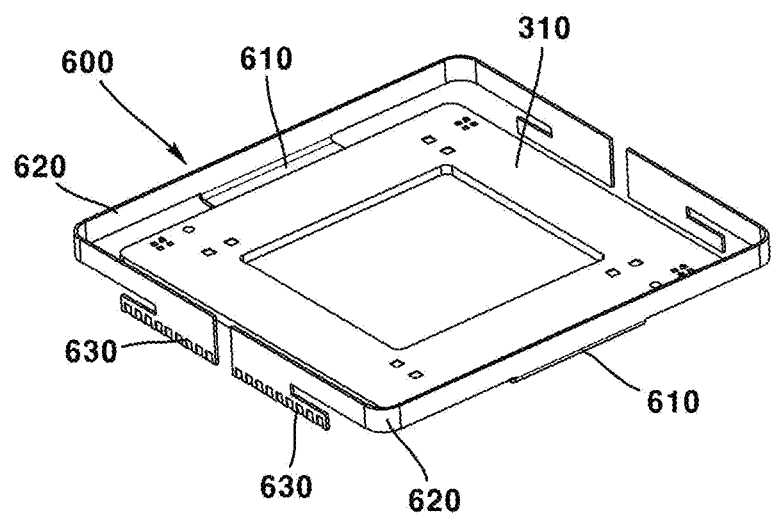
FIG. 15 is a perspective view of a connection substrate of FIG. 14 in a bent state.
Figure 16:
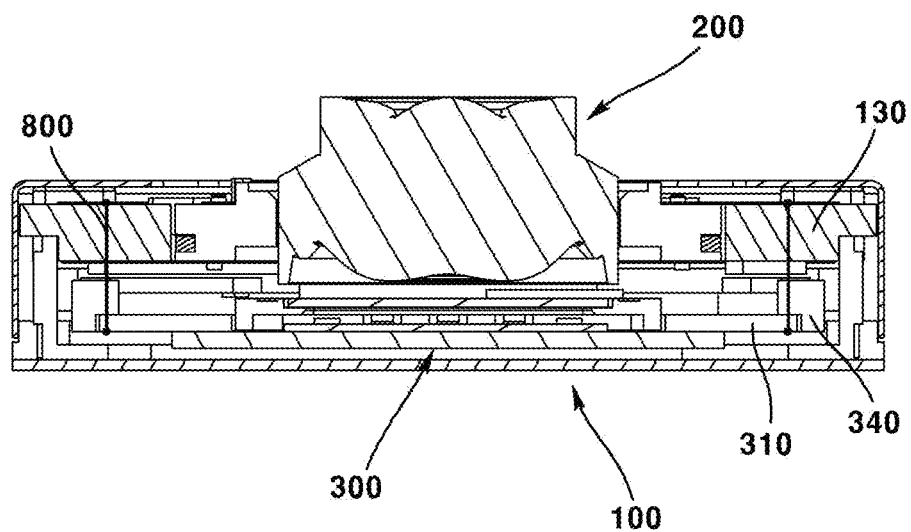
FIG. 16 is a cross-sectional view of a camera device according to the present embodiment. The wire of the camera device according to the present embodiment may be omitted in drawings other than FIG. 16. However, the wire may be illustrated and described in FIG. 16 as one configuration of the camera device according to the present embodiment.

FIG. 1 is a perspective view of a camera device according to the present embodiment; FIG. 2 is a perspective view of a state in which the cover member is omitted from the camera device according to the present embodiment; FIG. 3 is a plan view of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is an exploded perspective view of a camera device according to the present embodiment viewed from a different direction from FIG. 7; FIG. 9 is an exploded perspective view of a first moving part and related configuration of a camera device according to the present embodiment; FIG. 10 is an exploded perspective view of a second moving part and related configuration of a camera device according to the present embodiment; FIG. 11 is a perspective view of a second moving part and a connection substrate of a camera device according to the present embodiment; FIG. 12 is a plan view of a second moving part and a connection substrate of a camera device according to the present embodiment; FIG. 13 is a perspective view of a magnet and a coil of a camera device according to the present embodiment; FIG. 14 is a plan view illustrating the connection of a second substrate and a connection substrate of a camera device according to the present embodiment in a state before the connection substrate is bent; FIG. 15 is a perspective view of a connection substrate of FIG. 14 in a bent state; and FIG. 16 is a cross-sectional view of a camera device according to the present embodiment. The wire of the camera device according to the present embodiment may be omitted in drawings other than FIG. 16. However, the wire may be illustrated and described in FIG. 16 as one configuration of the camera device according to the present embodiment.

Hereinafter, a camera device according to the present embodiment will be described with reference to the drawings.

Figure 17:
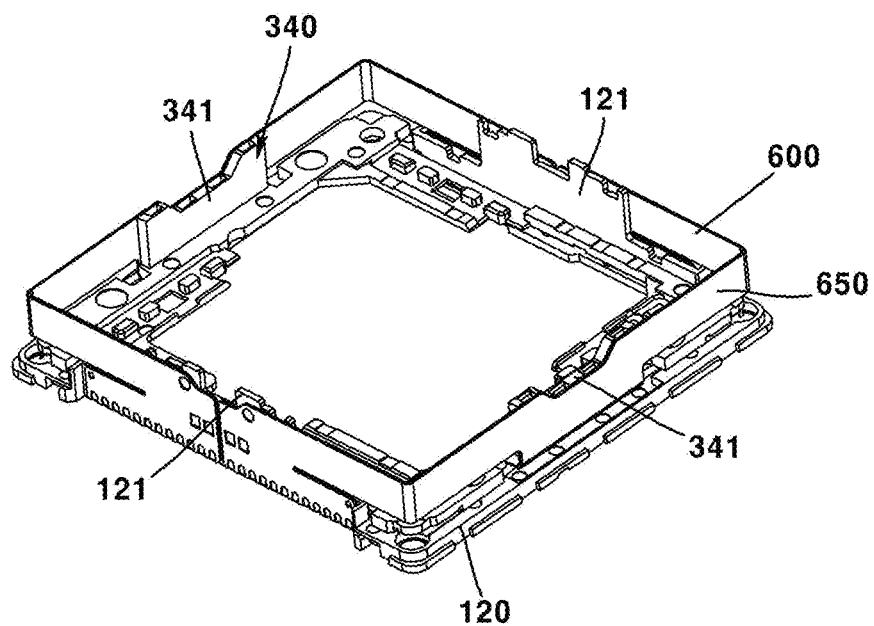
FIG. 17 is a perspective view of a base, a holder, and a connection substrate of a camera device according to a modified embodiment.
Figure 18:
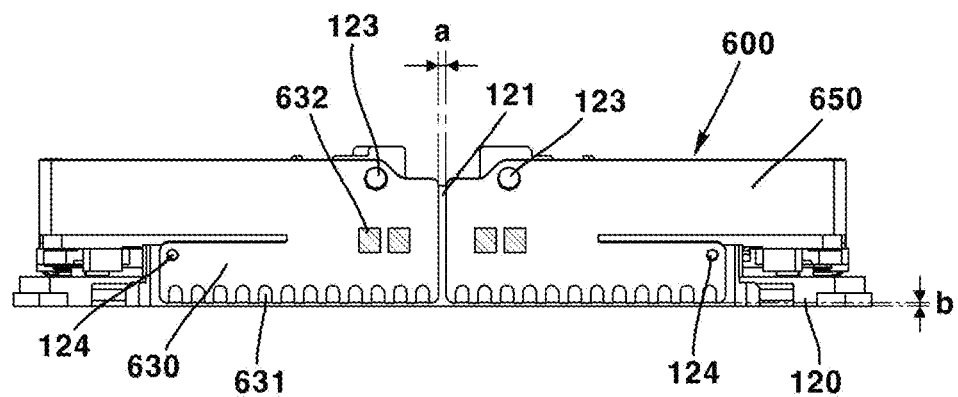
FIG. 18 is a side view of a base, a holder, and a connection substrate of a camera device according to a modified embodiment.
Figure 19:
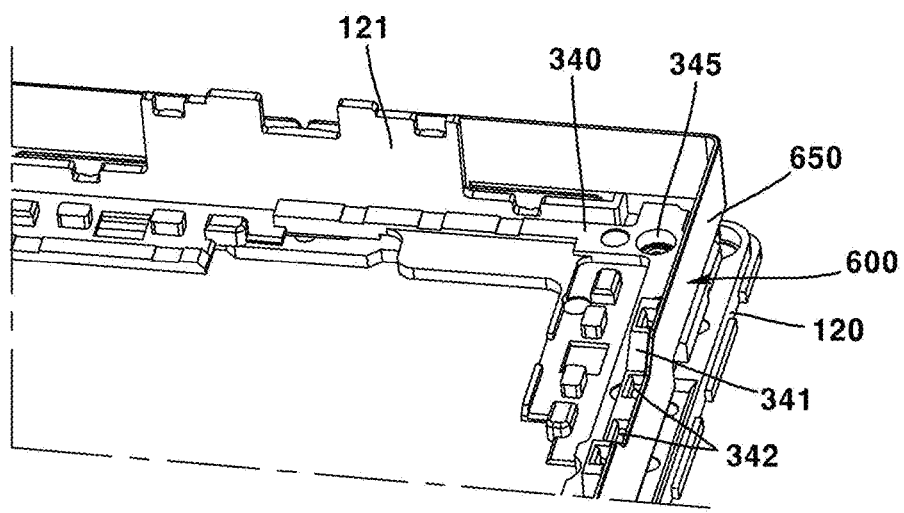
FIG. 19 is a partially enlarged perspective view of a base, a holder, and a connection substrate of a camera device according to a modified embodiment.
Figure 20:
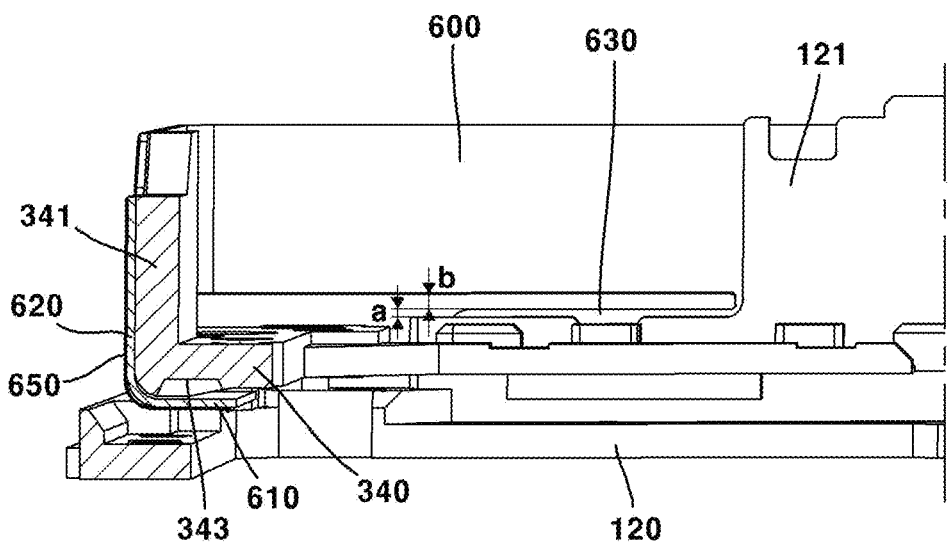
FIG. 20 is a partially enlarged cross-sectional view of a base, a holder, and a connection substrate of a camera device according to a modified embodiment.
Figure 21:
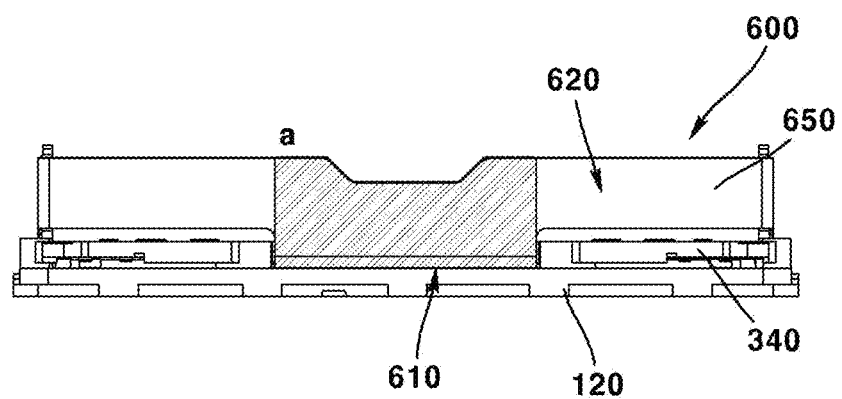
FIG. 21 is a side view of a base, a holder, and a connection substrate of a camera device according to a modified embodiment viewed from a different direction from FIG. 18.
Figure 22:
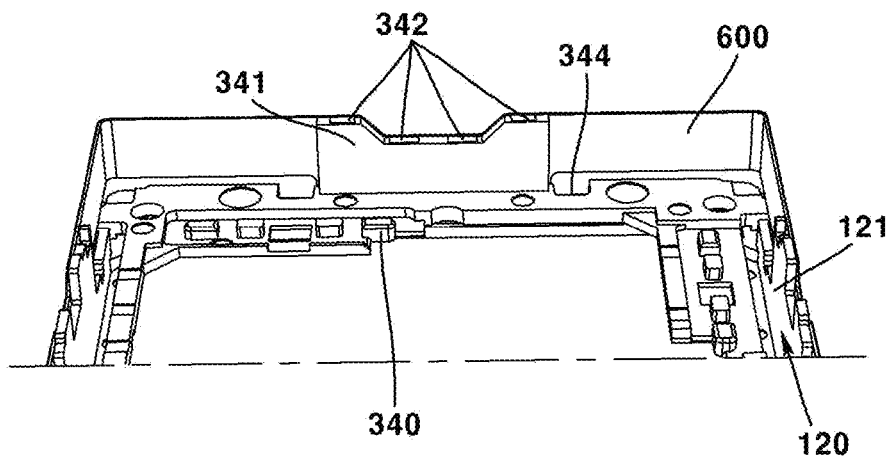
FIG. 22 is a partially enlarged perspective view of a base, a holder, and a connection substrate of a camera device according to a modified embodiment viewed from a different direction from FIG. 19.
Figure 23:
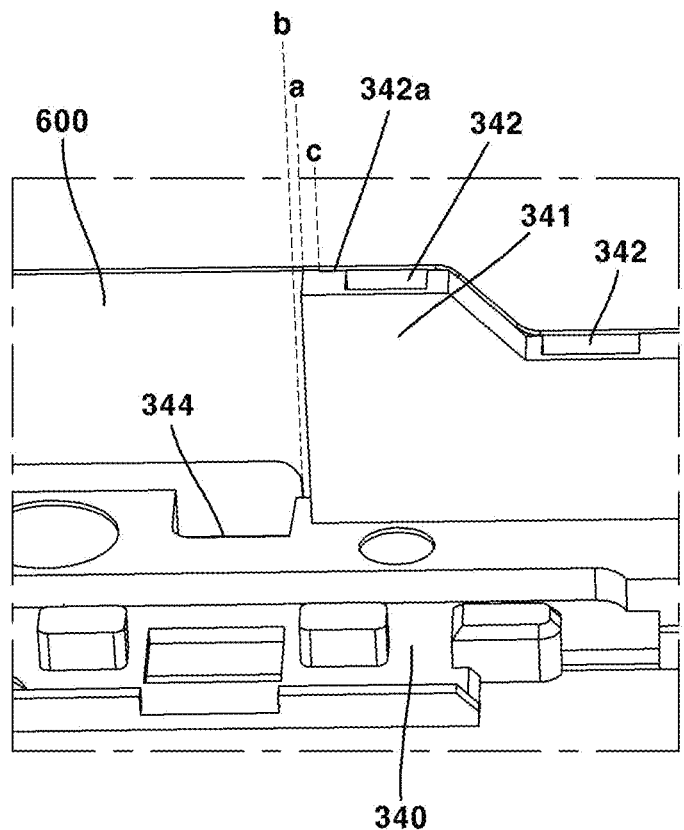
FIG. 23 is a partially enlarged view of FIG. 22.
Figure 24:
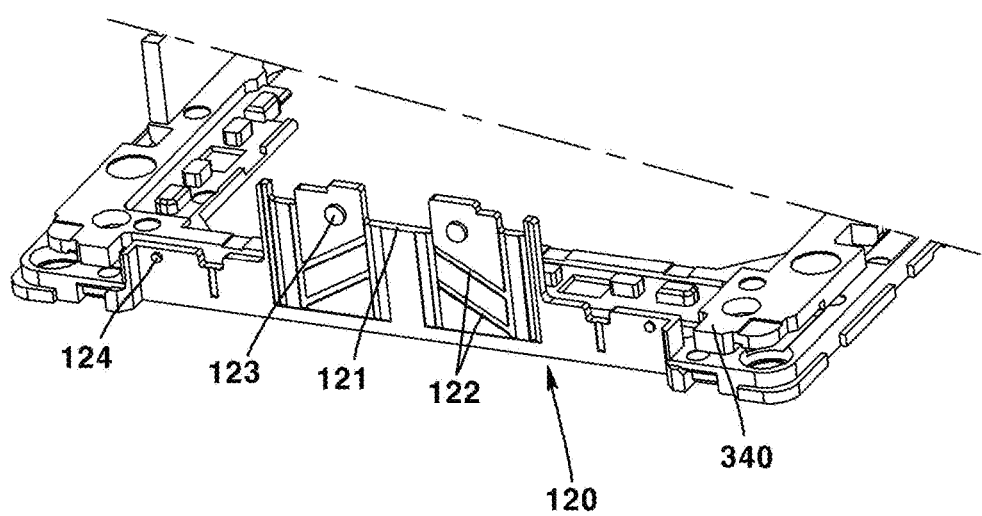
FIGS. 24 and 25 are perspective views of a base and a holder of a camera device according to a modified embodiment.
Figure 25:
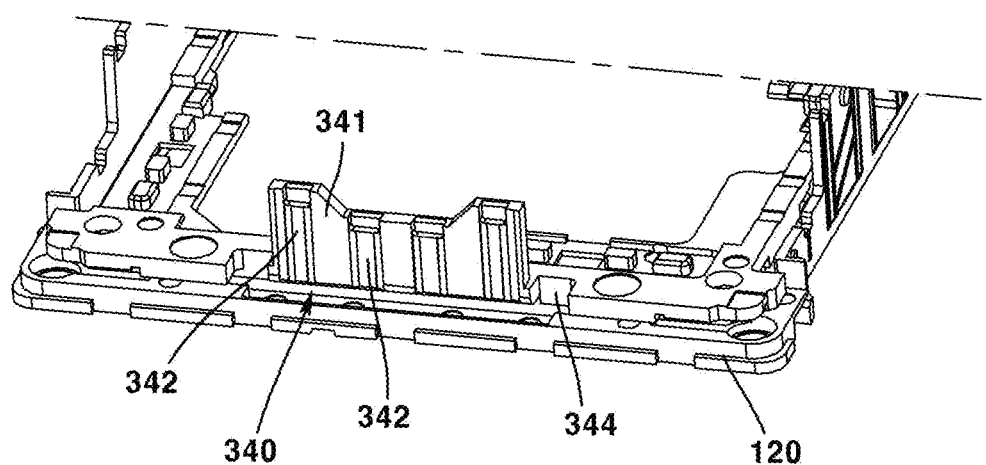

FIG. 17 is a perspective view of a base, a holder, and a connection substrate of a camera device according to a modified embodiment; FIG. 18 is a side view of a base, a holder, and a connection substrate of a camera device according to a modified embodiment; FIG. 19 is a partially enlarged perspective view of a base, a holder, and a connection substrate of a camera device according to a modified embodiment; FIG. 20 is a partially enlarged cross-sectional view of a base, a holder, and a connection substrate of a camera device according to a modified embodiment; FIG. 21 is a side view of a base, a holder, and a connection substrate of a camera device according to a modified embodiment viewed from a different direction from FIG. 18; FIG. 22 is a partially enlarged perspective view of a base, a holder, and a connection substrate of a camera device according to a modified embodiment viewed from a different direction from FIG. 19; FIG. 23 is a partially enlarged view of FIG. 22; and FIGS. 24 and 25 are perspective views of a base and a holder of a camera device according to a modified embodiment.

The camera device 10 may photograph any one or more of an image and a video. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device may comprise an auto focus assembly. The camera device 10 may comprise a handshake correction assembly. The camera device 10 may comprise an autofocus device. The camera device 10 may comprise a handshake correction device. The camera device 10 may comprise an actuator. The camera device 10 may comprise a lens driving actuator. The camera device 10 may comprise a sensor driven actuator. The camera device 10 may comprise an auto focus actuator. The camera device 10 may comprise a handshake correction actuator.

The camera device 10 may comprise a fixed part 100. The fixed part 100 may be a relatively fixed portion when the moving parts 200 and 300 move. The fixed part 100 may be a relatively fixed portion when one or more of a first moving part 200 and the second moving part 300 moves. The fixed part 100 may accommodate the first moving part 200 and the second moving part 300. The fixed part 100 may be disposed at an outer side of the first moving part 200 and the second moving part 300.

Although the first substrate 110 has been described as one configuration of the fixed part 100 throughout the specification, the first substrate 110 may be understood as a separate configuration from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical device 1. The first substrate 110 may comprise a connector connected to a power source of the optical device 1.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 by an adhesive. The base 120 may be disposed between the first substrate 110 and a housing 130.

The connection substrate 600 may be disposed in the base 120. The connection substrate 600 may be connected to the base 120. The connection substrate 600 may be fixed to the base 120. The connection substrate 600 may be coupled to the base 120. The connection substrate 600 may be attached to the base 120. The connection substrate 600 may be fixed to the base 120 by an adhesive. The connection substrate 600 may be in contact with the base 120.

The base 120 may comprise a coupling region. The base 120 may be coupled to the connection substrate 600 in the coupling region. The coupling region of the base 120 may comprise the protruding part 121. The base 120 may comprise a protruding part 121. The protruding part 121 may protrude from an upper surface of the base 120. The protruding part 121 may protrude upward from an outer side surface of the base 120. Or, the protruding part 121 may protrude horizontally from an outer side surface of the base 120. The protruding part 121 may protrude downward from an outer side surface of the base 120. The connection substrate 600 may be disposed in the coupling region of the base 120. The connection substrate 600 may be disposed on the protruding part 121 of the base 120. The connection substrate 600 may be connected to the protruding part 121 of the base 120. The connection substrate 600 may be fixed to the protruding part 121 of the base 120. The connection substrate 600 may be coupled to the protruding part 121 of the base 120. The connection substrate 600 may be attached to the protruding part 121 of the base 120. The connection substrate 600 may be fixed to the protruding part 121 of the base 120 by an adhesive. The connection substrate 600 may be in contact with the protruding part 121 of the base 120.

The terminal part 630 of the connection substrate 600 may be disposed on the protruding part 121 of the base 120. The terminal part 630 of the connection substrate 600 may be connected to the protruding part 121 of the base 120. The terminal part 630 of the connection substrate 600 may be fixed to the protruding part 121 of the base 120. The terminal part 630 of the connection substrate 600 may be coupled to the protruding part 121 of the base 120. The terminal part 630 of the connection substrate 600 may be attached to the protruding part 121 of the base 120. The terminal part 630 of the connection substrate 600 may be fixed to the protruding part 121 of the base 120 by an adhesive. The terminal part 630 of the connection substrate 600 may be in contact with the protruding part 121 of the base 120.

The lower end of the terminal part 630 of the connection substrate 600 may be spaced apart from the lower end of the base 120. The connection substrate 600 may comprise two connection substrates that are spaced apart from each other. The two connection substrates can be spaced apart from each other. The distance between the two connection substrates (refer to FIG. 18 *a*) may be 1.5 to 2.5 times the distance between the bottom of the terminal part 630 and the bottom of the base 120 (refer to FIG. 18 *b*). The distance a between the two connection substrates may be 1.8 to 2.2 times the distance b between the lower end of the terminal part 630 and the lower end of the base 120. The distance a between the two connection substrates may be 2.0 times the distance b between the bottom of the terminal part 630 and the bottom of the base 120. The connection substrate 600 may comprise first and second connection substrates that are spaced apart from each other. Each of the first and second connection substrates may comprise two terminal parts. That is, the connection substrate 600 may comprise a total of four terminal parts.

The base 120 may comprise a groove 122. The groove 122 may be an adhesive accommodating groove. At least a portion of an adhesive bonding the connection substrate 600 and the base 120 may be disposed in the groove 122. The groove 122 may be formed in the outer side surface of the base 120. The groove 122 may be formed in an outer side surface of the protruding part 121. The groove 122 may be formed by being recessed in an outer surface of the protruding part 121. The groove 122 may be opened upward. Through this structure, the adhesive may be injected into the groove 122 from the upper side. The groove 122 may comprise a first part extending in an optical axis direction and a second part obliquely connected to the first part. As a modified embodiment, the groove 122 may be formed by being recessed in an inner surface of the protruding part 121. In this case, the connection substrate 600 may be coupled to an inner surface of the protruding part 121.

The base 120 may comprise a first protrusion 123. The first protrusion 123 may be coupled to the connection substrate 600. The first protrusion 123 may be inserted into the hole of the connection substrate 600. The first protrusion 123 may protrude from an outer side surface of the protruding part 121. The first protrusion 123 may protrude outward from an outer side surface of the protruding part 121. The first protrusion 123 may protrude horizontally from an outer side surface of the protruding part 121. The first protrusion 123 may be formed on a side surface of the base 120.

The base 120 may comprise a second protrusion 124. The second protrusion 124 may be coupled to the connection substrate 600. The second protrusion 124 may be inserted into a hole of the connection substrate 600. The second protrusion 124 may protrude from an outer side surface of the base 120. The second protrusion 124 may be disposed at a lower position than the first protrusion 123. The diameter of the second protrusion 124 may be smaller than the diameter of the first protrusion 123. When viewed from the upper surface, two first protrusions 123 may be disposed between two second protrusions 124. The distance between two first protrusions 123 may be smaller than the distance between two second protrusions 124. When viewed from the upper surface, the distance between the first protrusion 123 and second protrusion 124 adjacent to the first protrusion 123 may be greater than the distance between the two first protrusions 123.

The groove 122, the first protrusion 123, and the second protrusion 124 of the base 120 are configurations of the modified embodiment, but can also be applied to the present embodiment.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to the base 120. The housing 130 may be coupled to the base 120. The housing 130 may be attached to the base 120 by an adhesive. The housing 130 may be disposed on the first substrate 110. The housing 130 may be disposed above the first substrate 110. The housing 130 may be formed of a member separate from the base 120.

The camera device 10 may comprise a cover member 140. The fixed part 100 may comprise a cover member 140. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole formed in the upper plate. The hole may be formed at a position corresponding to the lens 220. The cover member 140 may comprise a side plate. The side plate may comprise a plurality of side plates. The side plate may comprise four side plates. The side plate may comprise first to fourth side plates. The side plate may comprise first and second side plates being disposed opposite to each other, and third and fourth side plates being disposed opposite to each other. The cover member 140 may comprise a plurality of corners between the plurality of side plates.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a first moving part 200. The first moving part 200 may move with respect to the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be arranged to be movable in an optical axis direction in the fixed part 100. An auto focus (AF) function may be performed by moving the first moving part 200 in an optical axis direction with respect to the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart from the first substrate 110. The bobbin 210 may be disposed inside the housing 130. The bobbin 210 may be disposed inside the housing 130. At least a portion of the bobbin 210 may be accommodated in the housing 130. The bobbin 210 may be movably disposed in the housing 130. The bobbin 210 may be movably disposed on the housing 130 in an optical axis direction. The bobbin 210 may be coupled to the lens 220. The bobbin 210 may comprise a hollow or a hole. The lens 220 may be disposed in a hollow or hole of the bobbin 210.

The outer circumferential surface of the lens 220 may be coupled to the inner circumferential surface of the bobbin 210.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to an image sensor 330. The optical axis of the lens 220 may coincide with the optical axis of the image sensor 330. The optical axis may be the z-axis. The lens 220 may comprise a plurality of lenses. The lens 220 may comprise a 5 or 6 lenses.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 may move with respect to the fixed part 100. The second moving part 300 may move in a direction perpendicular to an optical axis direction with respect to the fixed part 100. The second moving part 300 may be disposed inside the fixed part 100. The second moving part 300 may be movably disposed inside the fixed part 100. The second moving part 300 may be movably disposed inside the fixed part 100 in a direction perpendicular to an optical axis direction. A handshake correction (OIS) function may be performed by moving the second moving part 300 in a direction perpendicular to an optical axis direction with respect to the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in a direction perpendicular to an optical axis direction and the optical axis direction. The second substrate 310 may move in a direction perpendicular to an optical axis direction. The second substrate 310 may be electrically connected to the image sensor 330. The second substrate 310 may move integrally with the image sensor 330. The second substrate 310 may comprise a hole. The image sensor 330 may be disposed in the hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 while being coupled with the image sensor 330 may be coupled below the second substrate 310.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and a sensor base 350. The image sensor 330 may be electrically connected to the second substrate 310. The image sensor 330 may move integrally with the second substrate 310.

Light passing through the lens 220 and the filter 360 may be incident to the image sensor 330 to form an image. The image sensor 330 may be electrically connected to the sensor substrate 320, the second substrate 310, and the first substrate 110. The image sensor 330 may comprise an effective image region. The image sensor 330 may convert light being irradiated to the effective image region into an electrical signal. The image sensor 330 may comprise any one or more among a charge coupled device (CCD), a metal oxide semi-conductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. A second coil 440 may be disposed in the holder 340. The holder 340 may comprise a protrusion on which the second coil 440 is wound. The holder 340 may comprise a hole in which the Hall sensor 445 is disposed.

The connection substrate 600 may be disposed in the holder 340. The connection substrate 600 may be connected to the holder 340. The connection substrate 600 may be fixed to the holder 340. The connection substrate 600 may be coupled to the holder 340. The connection substrate 600 may be attached to the holder 340. The connection substrate 600 may be fixed to the holder 340 by an adhesive. The connection substrate 600 may be in contact with the holder 340.

The holder 340 may comprise a coupling region. The holder 340 may be coupled to the connection substrate 600 in the coupling region. The coupling region of the holder 340 may comprise a protruding part 341. The holder 340 may comprise a protruding part 341. The protruding part 341 may protrude from an upper surface of the holder 340. The protruding part 341 may protrude upward from an outer side surface of the holder 340. Or, the protruding part 341 may protrude horizontally from an outer side surface of the holder 340. The protruding part 341 may protrude downward from an outer side surface of the holder 340. The connection substrate 600 may be disposed in the coupling region of the holder 340. The connection substrate 600 may be disposed in the protruding part 341 of the holder 340. The connection substrate 600 may be connected to the protruding part 341 of the holder 340. The connection substrate 600 may be fixed to the protruding part 341 of the holder 340. The connection substrate 600 may be coupled to the protruding part 341 of the holder 340. The connection substrate 600 may be attached to the protruding part 341 of the holder 340. The connection substrate 600 may be fixed to the protruding part 341 of the holder 340 by an adhesive. The connection substrate 600 may be in contact with the protruding part 341 of the holder 340.

At least a part of the connection part 610 and the extension part 620 of the connection substrate 600 may be disposed in the protruding part 341 of the holder 340. At least a part of the connection part 610 and the extension part 620 of the connection substrate 600 may be connected to the protruding part 341 of the holder 340. At least a part of the connection part 610 and the extension part 620 of the connection substrate 600 may be fixed to the protruding part 341 of the holder 340. At least a part of the connection part 610 and the extension part 620 of the connection substrate 600 may be coupled to the protruding part 341 of the holder 340. At least a part of the connection part 610 and the extension part 620 of the connection substrate 600 may be attached to the protruding part 341 of the holder 340. At least a part of the connection part 610 and the extension part 620 of the connection substrate 600 may be fixed to the protruding part 341 of the holder 340 by an adhesive. At least a part of the connection part 610 and the extension part 620 of the connection substrate 600 may be in contact with the protruding part 341 of the holder 340.

The holder 340 may comprise a hole 345. The wire 800 may pass through the hole 345 of the holder 340. The hole 345 of the holder 340 may be formed to have a larger diameter than the wire 800 so that the holder 340 and the wire 800 do not interfere when the holder 340 is moved. A damper may be disposed in the hole 345 of the holder 340.

The holder 340 may comprise a groove 342. The groove 342 may be an adhesive accommodating groove. At least a part of an adhesive bonding the connection substrate 600 and the holder 340 may be disposed in the groove 342. The groove 342 may be formed in an outer side surface of the holder 340. The groove 342 may be formed in an outer side surface of the protruding part 341. The groove 342 may be formed by being recessed in an outer surface of the protruding part 341. The groove 342 may be open upward. Through this structure, the adhesive may be injected into the groove 342 from the upper side. The groove 342 may comprise a plurality of grooves. The groove 342 may comprise a step 342a.

Referring to FIG. 23, the adhesive may be applied up to the portion in which the edge of the protruding part 341 of the holder 340, which is the first boundary line (refer to a of FIG. 23), and the connection substrate 600 contact each other. In a modified embodiment, the adhesive may be applied up to a portion outside the first boundary line, which is the second boundary line (refer to b of FIG. 23). The second boundary line may be spaced apart from the first boundary line by 0.1 mm to 0.3 mm in the horizontal direction. The second boundary line may be spaced apart from the first boundary line by 0.15 mm to 0.25 mm in the horizontal direction. The second boundary line may be spaced apart from the first boundary line by about 0.2 mm in the horizontal direction. The second boundary line may be a virtual line extending from the edge of the connection part 610 of the connection substrate 600. In another modified embodiment, the adhesive may be applied up to the contact portion of the third boundary line (refer to c of FIG. 23), the connection substrate 600 and the step 342a. Or, the adhesive may be disposed only in the groove 342 and may not be disposed in a space corresponding to the step 342a.

From the connection substrate 600 to the portion fixed to the holder 340 (refer to a of FIG. 21) may be referred to as a connection part 610. That is, the connection part 610 may be up to the first boundary line (refer to a of FIG. 23). In a modified embodiment, the connection part 610 may be up to the second boundary line (refer to b of FIG. 23). In another modified embodiment, the connection part 610 may be up to the third boundary line (refer to c of FIG. 23).

The holder 340 may comprise a groove 343. The groove 343 may be formed in a lower surface of the holder 340. The groove 343 may be recessed from a lower surface of the holder 340. The groove 343 may be disposed at a position corresponding to the bent portion of the connection part 610 of the connection substrate 600. The groove 343 may be disposed adjacent to the bent portion of the connection part 610 of the connection substrate 600. An adhesive may be disposed in the groove 343.

The holder 340 may comprise a groove 344. The groove 344 may be formed by being recessed from an outer circumferential surface of the holder 340. The groove 344 may be disposed next to the protruding part 341. The groove 344 may be formed to inhibit interference with the connection substrate 600.

The groove 342, the groove 343, and the groove 344 of the holder 340 are configurations of a modified embodiment, but can also be applied to the present embodiment.

The camera device 10 may comprise a sensor base 350. The second moving part 300 may comprise a sensor base 350. The sensor base 350 may be disposed in the sensor substrate 320. The sensor base 350 may comprise a hole formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light of a specific frequency band from being incident on the image sensor 330 among the light passing through the lens 220. The filter 360 may comprise an infrared cut filter. The filter 360 may block infrared rays from being incident on the image sensor 330.

The camera device 10 may comprise a driving unit. The driving unit may move the moving parts 200 and 300 with respect to the fixed part 100. The driving unit may perform an auto focus (AF) function. The driving unit may perform a handshake correction (OIS) function. The driving unit may move the lens 220. The driving unit may move the image sensor 330. The driving unit may comprise a magnet and a coil. The driving unit may comprise a shape memory alloy (SMA).

The camera device 10 may comprise a first driving unit. The first driving unit may be an AF driving unit. The first driving unit may move the first moving part 200 in an optical axis direction. The first driving unit may move the bobbin 210 in an optical axis direction. The lens 220 may be moved in an optical axis direction. The first driving unit may perform an auto focus (AF) function. The first driving unit may move the first moving part 200 in an upward direction of the optical axis direction. The first driving unit may move the first moving part 200 downward direction of the optical axis direction.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor base 350 in a direction perpendicular to the optical axis direction. The second driving unit may move the filter 360 in a direction perpendicular to the optical axis direction. The second driving unit may perform a handshake correction (OIS) function.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about the optical axis.

In the present embodiment, the first driving unit may comprise a first coil 430. The second driving unit may comprise a second coil 440. The first driving unit and the second driving unit may comprise a driving magnet 410 commonly used for interaction between the first coil 430 and the second coil 440. That is, the first driving unit and the second driving unit may comprise individually controlled coils and a common magnet.

The camera device 10 may comprise a driving magnet 410. The driving unit may comprise a driving magnet 410. The driving magnet 410 may be a magnet. The driving magnet 410 may be a permanent magnet. The driving magnet 410 may be a common magnet. The driving magnet 410 may be commonly used for autofocus (AF) and handshake correction (OIS).

The driving magnet 410 may be disposed in the fixed part 100. The driving magnet 410 may be fixed to the fixed part 100. The driving magnet 410 may be coupled to the fixed part 100. The driving magnet 410 may be attached to the fixed part 100 by an adhesive. The driving magnet 410 may be disposed in the housing 130. The driving magnet 410 may be fixed to the housing 130. The driving magnet 410 may be coupled to the housing 130. The driving magnet 410 may be attached to the housing 130 by an adhesive. The driving magnet 410 may be disposed at a corner of the housing 130. The driving magnet 410 may be disposed to be biased toward a corner of the housing 130.

The driving magnet 410 may be a two-pole magnetized magnet comprising one N-pole region and one S-pole region. As a modified embodiment, the driving magnet 410 may be a four-pole magnetized magnet comprising two N-pole regions and two S-pole regions.

The driving magnet 410 may comprise a plurality of magnets. The driving magnet 410 may comprise four magnets. The driving magnet 410 may comprise first to fourth magnets. The first to fourth magnets may be disposed symmetrically with respect to the optical axis. The first to fourth magnets may be formed to have the same size and shape as each other.

In a modified embodiment, the driving magnet 410 may comprise a first magnet being disposed at a position corresponding to the first coil 430 and a second magnet being disposed at a position corresponding to the second coil 440. At this time, the first magnet and the second magnet may be disposed in the fixed part 100, and the first coil 430 and the second coil 440 may be disposed in the moving parts 200 and 300. Or, the first magnet and the second magnet may be disposed in the moving parts 200 and 300, and the first coil 430 and the second coil 440 may be disposed in the fixed part 100.

The camera device 10 may comprise a first coil 430. The driving unit may comprise a first coil 430. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed in the bobbin 210. The first coil 430 may be fixed to the bobbin 210. The first coil 430 may be coupled to the bobbin 210. The first coil 430 may be attached to the bobbin 210 by an adhesive. The first coil 430 may be electrically connected to a driver IC 480. The first coil 430 may be electrically connected to a lower elastic member 720, a sensing substrate 470, and the driver IC 480. The first coil 430 may receive current from the driver IC 480.

The first coil 430 may be disposed at a position corresponding to the driving magnet 410. The first coil 430 may be disposed in the bobbin 210 at a position corresponding to the driving magnet 410. The first coil 430 may face the driving magnet 410. The first coil 430 may comprise a surface facing the driving magnet 410. The first coil 430 may be disposed adjacent to the driving magnet 410. The first coil 430 may interact with the driving magnet 410. The first coil 430 may electromagnetically interact with the driving magnet 410.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 in an upward direction of the optical axis direction. The first coil 430 may move the bobbin 210 in an upward direction of the optical axis direction. The first coil 430 may move the lens 220 in an upward direction of the optical axis direction. The first coil 430 may move the first moving part 200 in a downward direction of the optical axis direction. The first coil 430 may move the bobbin 210 in a downward direction of the optical axis direction. The first coil 430 may move the lens 220 in a downward direction of the optical axis direction.

The camera device 10 may comprise a second coil 440. The driving unit may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be wound around the protrusion of the holder 340 and disposed. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the driving magnet 410. The second coil 440 may be disposed at a position corresponding to the driving magnet 410 in the holder 340. The second coil 440 may face the driving magnet 410. The second coil 440 may comprise a surface facing the driving magnet 410. The second coil 440 may be disposed adjacent to the driving magnet 410. The second coil 440 may interact with the driving magnet 410. The second coil 440 may electromagnetically interact with the driving magnet 410.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis.

The second coil 440 may comprise a plurality of coils. The second coil 440 may comprise four coils. The second coil 440 may comprise a coil for shift in x-axis. The second coil 440 may comprise a coil for shift in y-axis.

The second coil 440 may comprise a second-first coil 441. The second-first coil 441 may be a first sub-coil. The second-first coil 441 may be a coil for x-axis shift. The second-first coil 441 may move the second moving part 300 in the x-axis direction. The second-first coil 441 may be disposed in length along the y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, the two coils of the second-first coil 441 may receive current together. Or, the two coils of the second-first coil 441 may be electrically separated from each other to receive current individually.

The second coil 440 may comprise a second-second coil 442. The second-second coil 442 may be a second sub-coil. The second-second coil 442 may be a coil for y-axis shift. The second-second coil 442 may move the second moving part 300 in the y-axis direction. The second-second coil 442 may be disposed in length along the x-axis. The second-first coil 441 may comprise a plurality of coils. The second-second coil 442 may comprise two coils. Two coils of the second-second coil 442 may be electrically connected to each other. The second-second coil 442 may comprise a connection coil connecting the two coils. In this case, the two coils of the second-second coil 442 may receive current together. Or, the two coils of the second-second coil 442 may be electrically separated from each other to receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall device (Hall IC). The Hall sensor 445 may detect the driving magnet 410. The Hall sensor 445 may detect a magnetic force of the driving magnet 410. The Hall sensor 445 may face the driving magnet 410. The Hall sensor 445 may be disposed at a position corresponding to the driving magnet 410. The Hall sensor 445 may be disposed adjacent to the driving magnet 410. The Hall sensor 445 may detect the position of the second moving part 300. The Hall sensor 445 may detect the movement of the second moving part 300. The Hall sensor 445 may be disposed in the hollow of the second coil 440. The sensed value detected by the Hall sensor 445 may be used to feedback the handshake correction operation. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect the displacement of the second moving part 300 in the x-axis direction. The second Hall sensor may detect the displacement of the second moving part 300 in the y-axis direction. The third Hall sensor may detect the rotation of the second moving part 300 about the z-axis alone or together with any one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be adhered to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the driving magnet 410. Through this, the influence of the sensing magnet 450 on driving may be minimized.

The sensing magnet 450 may be disposed opposite to a correction magnet 460. The sensing magnet 450 and the correction magnet 460 may be disposed opposite to each other in the first moving part 200. The sensing magnet 450 and the correction magnet 460 may be disposed opposite to each other in the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed in the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a size smaller than that of the driving magnet 410. Through this, the influence of the correction magnet 460 on driving can be minimized. In addition, the correction magnet 460 may be disposed on the opposite side of the sensing magnet 450 to form a magnetic force balance with the sensing magnet 450. Through this, the tilt that may be generated by the sensing magnet 450 can be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130.

The camera device 10 may comprise a driver IC 480. The driver IC 480 may be an AF driver IC. The driver IC 480 may be electrically connected to the first coil 430. The driver IC 480 may apply a current to the first coil 430 to perform AF driving. The driver IC 480 may apply a power source to the first coil 430. The driver IC 480 may apply a current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part 200. The detected value detected by the sensor may be used for feedback of autofocus driving.

The camera device 10 may comprise a gyro sensor 490. The gyro sensor 490 may be disposed in the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shaking of the camera device 10 detected by the gyro sensor 490 may be used to drive a handshake correction (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply a power source to the second coil 440. The driver IC 495 may apply a current to the second coil 440. The driver IC 495 may apply a voltage to the second coil 440. The driver IC 495 may be disposed in the second substrate 310.

The camera device 10 may comprise a connection substrate 600. The connection substrate 600 may be a connection part. The connection substrate 600 may be a connection member. The connection substrate 600 may be a stretchable substrate. The connection substrate 600 may be a flexible substrate. The connection substrate 600 may be a flexible printed circuit board. The connection substrate 600 may be a flexible printed circuit board (FPCB). The connection substrate 600 may have flexibility in at least a part. The second substrate 310 and the connection substrate 600 may be integrally formed.

The connection substrate 600 may support the second moving part 300. The connection substrate 600 may support the movement of the second moving part 300. The connection substrate 600 may movably support the second moving part 300. The connection substrate 600 may connect the second moving part 300 and the fixed part 100. The connection substrate 600 may connect the first substrate 110 and the second substrate 310. The connection substrate 600 may electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about the optical axis. The connection substrate 600 may limit the movement of the second moving part 300 in an optical axis direction. A portion of the connection substrate 600 may be coupled to the base 120.

The connection substrate 600 may comprise two connection substrates 600 spaced apart from each other and formed symmetrically. As shown in FIG. 14, two connection substrates 600 may be disposed at both sides of the second substrate 310. The connection substrate 600 connected as shown in FIG. 14 may be bent a total of 6 times to connect the first substrate 110 and the second substrate 310 as shown in FIG. 15.

The connection substrate 600 may comprise a first region connected to the second substrate 310 and being bent in an optical axis direction. The first region is connected to the second substrate 310 and may be bent in an optical axis direction. The first region is connected to the second substrate 310 and may be extended in an optical axis direction. The first region may be connected to the second substrate 310 and extended by being bent in an optical axis direction. The connection substrate 600 may comprise a second region being extended from the first region. The connection substrate 600 may comprise a third region that is bent in a direction perpendicular to the optical axis direction in the second region. The third region may be bent in a direction perpendicular to the optical axis direction in the second region. The third region may be extended in a direction perpendicular to the optical axis direction in the second region. The third region may be bent and extended in a direction perpendicular to the optical axis direction in the second region.

The connection substrate 600 may comprise a connection part 610 comprising a first region. The connection substrate 600 may comprise an extension part 620 comprising a second region and a third region. The connection substrate 600 may comprise a connection part 610 being connected to the second substrate 310. The connection substrate 600 may comprise an extension part 620 being extended from the connection part 610. The connection substrate 600 may comprise a terminal part 630 being connected to the extension part 620 and comprising a terminal.

The connection substrate 600 may comprise a connection part 610. The connection part 610 may be connected to the second moving part 300. The connection part 610 may be coupled to the second moving part 300. The connection part 610 may be fixed to the second moving part 300. The connection part 610 may be connected to the second substrate 310. The connection part 610 may be coupled to the second substrate 310. The connection part 610 may be fixed to the second substrate 310. The connection part 610 may comprise a first bending region being bent in an optical axis direction. The connection part 610 may comprise a first region being bent in an optical axis direction with respect to the second substrate 310 and a second region being extended from the first region and being bent in a direction perpendicular to the optical axis direction. The connection part 610 may be fixed to the holder 340. However, an adhesive may not be applied to a portion of the connection part 610.

The connection part 610 may comprise a portion being bent in an optical axis direction and fixed to the holder 340. The connection part 610 may comprise a bent portion. At least a portion of the connection part 610 may be fixed to the holder 340 so that the bent portion of the connection part 610 does not return to its original shape. At least a portion of the connection part 610 may be attached to the holder 340 so that the bent portion of the connection part 610 does not return to its original shape. At least a portion of the connection part 610 may be coupled to the holder 340 so that the bent portion of the connection part 610 does not return to its original shape. Or, a separate reinforcing member for maintaining the shape of the bent portion of the connection part 610 may be disposed in the connection substrate 600 or the holder 340. The reinforcing member may comprise any one or more among a stiffener, a metal member, and a conducting member. A separate stiffener for maintaining the shape of the bent portion of the connection part 610 may be disposed in the connection substrate 600 or the holder 340.

In a modified embodiment, the connection part 610 may comprise a hole. At this time, a protrusion may be formed on the outer surface of the protruding part 341 of the holder 340. The protrusion of the protruding part 341 of the holder 340 may be inserted into the hole of the connection part 610.

In addition, in a modified embodiment, the connection part 610 may comprise a hole. At this time, the holder 340 may not have a corresponding protrusion. Both regions of the connection part 610 may be divided by the hole of the connection part 610. The hole of the connection part 610 may be a hole that separates the connection part 610 into two pieces. A hole of the connection part 610 may be formed in the bent region. The connection part 610 may be divided into two connection parts 610 by a hole when viewed from below.

An adhesive may be disposed between the connection part 610 and a lower surface of the holder 340. However, in a modified embodiment, the connection part 610 may be in direct contact with the lower surface of the holder 340. The connection part 610 may be in close contact with the lower surface of the holder 340.

The connection substrate 600 may comprise an extension part 620. The extension part 620 may be a leg part. The extension part 620 may connect the connection part 610 and the terminal part 630. The extension part 620 may be extended from the connection part 610. The extension part 620 may comprise a second bending region being bent in a direction perpendicular to the optical axis direction.

In an optical axis direction, a distance between the extension part 620 and the holder 340 may be greater than a distance between the driving magnet 410 and the second coil 440. Through this, even when the second moving part 200 moves by the impact, since the connection substrate 600 does not come into contact because the driving magnet 410 and the second coil 440 are in contact first, so that it is possible to inhibit damage to the connection substrate 600.

The connection substrate 600 may comprise a terminal part 630. The terminal part 630 may be coupled to the fixed part 100. The terminal part 630 may be fixed to the fixed part 100. The terminal part 630 may be coupled to the first substrate 110. The terminal part 630 may be connected to the first substrate 110. The terminal part 630 may be soldered to the first substrate 110. The terminal part 630 may be fixed to the first substrate 110. The terminal part 630 may be coupled to the base 120. The terminal part 630 may be fixed to the base 120. The terminal part 630 may comprise a terminal. The terminal may be coupled to the first substrate 110.

As illustrated in FIG. 20, a part of the terminal part 630 may be protruded above the base 120. The height at which the terminal part 630 is protruded above the base 120 (refer to a of FIG. 20) may be 40 to 60% of the gap between the terminal part 630 and the extension part 620 (refer to b of FIG. 20). The height at which the terminal part 630 is protruded above the base 120 may be 45 to 55% of the gap b between the terminal part 630 and the extension part 620. The height a at which the terminal part 630 is protruded above the base 120 may be 47 to 53% of the gap b between the terminal part 630 and the extension part 620. The height a at which the terminal part 630 is protruded above the base 120 may be 50% of the gap b between the terminal part 630 and the extension part 620.

The gap between the terminal part 630 and the extension part 620 may be formed by a groove. The movable length of the extension part 620 may be secured by a gap or groove between the terminal part 630 and the extension part 620.

The connection substrate 600 may comprise a first terminal 631. The first terminal 631 may be disposed at a lower end of the outer surface of the terminal part 630. The first terminal 631 may be connected to a terminal of the first substrate 110. The first terminal 631 may be electrically connected to a terminal of the first substrate 110 through a conductive member. The first terminal 631 may be coupled to a terminal of the first substrate 110 through a conductive member. The first terminal 631 may comprise a plurality of first terminals.

The connection substrate 600 may comprise a second terminal 632. The second terminal 632 may be disposed in an outer surface of the terminal part 630. The second terminal 632 may be disposed above the first terminal 631. The second terminal 632 may be electrically connected to the first terminal 631. The second terminal 632 may be electrically connected to the sensing substrate 470. The second terminal 632 may be electrically connected to the driver IC 480. The second terminal 632 may comprise a plurality of second terminals. Each of the plurality of second terminals may be formed to be larger than each of the plurality of first terminals. The plurality of second terminals may be spaced apart from each other by a wider width than the plurality of first terminals. In terms of width, the plurality of second terminals may be spaced apart from each other by a wider width than the plurality of first terminals. As illustrated in FIG. 18, when viewed from the outside, the second terminal 632 may be formed to have a wider width than the first terminal 631. The width of the second terminal 632 may be 1.2 to 1.8 times the width of the first terminal 631. The width of the second terminal 632 may be 1.3 to 1.7 times the width of the first terminal 631. The driver IC 480 may be replaced with a Hall sensor-combined driver IC, a Hall sensor, or a circuit element. At this time, the second terminal 632 may be electrically connected to the Hall sensor-combined driver IC. The second terminal 632 may be electrically connected to the Hall sensor. The second terminal 632 may be electrically connected to a circuit element. The Hall sensor-combined driver IC or circuit device may comprise a Hall sensor block and a drive IC block. At this time, the second terminal 632 may be electrically connected to both the Hall sensor block and the drive IC block of the circuit element. In addition, the second terminal 632 may be electrically connected only to the Hall sensor block of the circuit element. In addition, the second terminal 632 may be electrically connected to only all of the drive IC blocks of the circuit element.

In the present embodiment, the camera device 10 may comprise a flexible substrate. The flexible substrate may connect the fixed part 100 and the second moving part 300. The flexible substrate may comprise a connection part 610 being connected to the second moving part 300, an extension part 620 being extended from the connection part 610, and a terminal part 630 being connected to the extension part 620 and comprising a terminal.

In the present embodiment, the connection substrate 600 may comprise a first part being coupled to the first substrate 110, a second part being coupled to the second substrate 310, and a third part connecting the first part and the second part. The third part may be disposed parallel to an optical axis at least in part. The third part may be formed so that the length in an optical axis direction is longer than the thickness. The second part of the connection substrate 600 may be disposed parallel to the second substrate 310 at least in part. The third part of the connection substrate 600 may be disposed perpendicular to the second part at least in part. The third part of the connection substrate 600 may be bent roundly in the portion corresponding to the corner of the second substrate 310. The second substrate 310 may comprise a first side surface and a second side surface being disposed opposite to each other, and a third side surface and a fourth side surface being disposed opposite to each other. The second part of the connection substrate 600 may be coupled with the first side surface and the second side surface of the second substrate 310. The first part of the connection substrate 600 may be coupled to a portion of the first substrate 110 corresponding to the third side surface and the fourth side surface of the second substrate 310.

The connection substrate 600 may comprise a first part being fixed to the second moving part 300 and a second part being fixed to the fixed part 100. The connection substrate 600 may comprise a first part being fixed to the holder 340 and a second part being fixed to the base 120.

The camera device 10 may comprise a conducting member. The connection substrate 600 may comprise a conducting member. The conducting member may be disposed on an outer surface of the connection substrate 600. The conducting member may be coupled to an outer surface of the connection substrate 600. The conducting member may be an EMI member. The EMI member may have adhesive properties. An EMI member may be disposed on an outer surface of the connection substrate 600. The EMI element may be grounded. The EMI member may be electrically connected to the ground terminal. The EMI member may be electrically connected to the image sensor 330. The EMI member may be electrically connected to the driver IC 495. The EMI member may be an EMI tape. An EMI tape may be disposed on an outer surface of the connection substrate 600. The EMI tape can be grounded. The EMI tape may be electrically connected to the ground terminal. The EMI tape may be electrically connected to the image sensor 330. The EMI tape may be electrically connected to the driver IC 495.

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 130. The elastic member 700 may elastically connect the bobbin 210 and the housing 130. The elastic member 700 may movably support the first moving part 200 with respect to the fixed part 100. The elastic member 700 may be deformed when the first moving part 200 moves. When the movement of the first moving part 200 is finished, the elastic member 700 may position the first moving part 200 to an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part.

The camera device 10 may comprise an upper elastic member 710. The elastic member 700 may comprise an upper elastic member 710. The upper elastic member 710 may be disposed on the lower elastic member 720. The upper elastic member 710 may comprise an inner side portion coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise an outer side portion coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connection part connecting the inner side portion and the outer side portion. The connection part may have elasticity.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. An inner side portion of the lower elastic member 720 may be coupled to a lower portion of the bobbin 210. An inner side portion of the lower elastic member 720 may be disposed on a lower surface of the bobbin 210. The lower elastic member 720 may comprise an outer side portion being coupled to the housing 130. An outer side portion of the lower elastic member 720 may be coupled to an upper portion of the housing 130. An outer side portion of the lower elastic member 720 may be disposed on an upper surface of the housing 130. The lower elastic member 720 may comprise a connection part connecting the inner side portion and the outer side portion. The connection part may have elasticity.

The lower elastic member 720 may comprise a plurality of lower portion elastic units. The lower elastic member 720 may comprise first and second lower portion elastic units 720-1 and 720-2. The lower elastic member 720 may comprise two lower portion elastic units 720-1 and 720-2. The two lower portion elastic units 720-1 and 720-2 are spaced apart from each other to electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 may connect the fixed part 100 and the second moving part 300. The wire 800 may elastically connect the fixed part 100 and the second moving part 300. The wire 800 may connect the housing 130 and the second substrate 310. The wire 800 may elastically connect the housing 130 and the second substrate 310. The wire 800 may movably support the second moving part 300. The wire 800 may support the second moving part 300 to move or rotate in a direction perpendicular to the optical axis direction. The wire 800 may be disposed in an optical axis direction. The wire 800 may be disposed parallel to the optical axis. The wire 800 may be formed of metal. The wire 800 may be formed of a conductive material. The wire 800 may have elasticity at least in part. The wire 800 may comprise a plurality of wires. The wire 800 may comprise four wires. In addition, in a modified embodiment, the connection substrate 600 is omitted and instead the wire 800 may comprise 36 wires.

The camera device 10 according to the present embodiment may use a common magnet for AF and OIS driving. In the present embodiment, the VCM magnetic field structure for driving a total of 4 axes which are one axis for AF (Z-shift) and 3 axes of OIS (X-shift, Y-shift, Z-Roll) can be implemented with 4 magnets. In addition, in the present embodiment, through the FPCB bending structure, the electrical connection and the role of the spring can be performed together.

In the present embodiment, it is possible to expect the effect of material cost reduction through reduction in the number of magnets to be adopted through the application of a common structure of driving magnets. In addition, in the present embodiment, it is possible to reduce the height dimension of the camera device 10 through the application of the common structure of driving magnets. In addition, in the present embodiment, it is possible to increase assembly and productivity by implementing a spring shape by bending the connection substrate 600 a total of 6 times.

Hereinafter, the operation of the camera device according to the present embodiment will be described with reference to the drawings.

Figure 26:
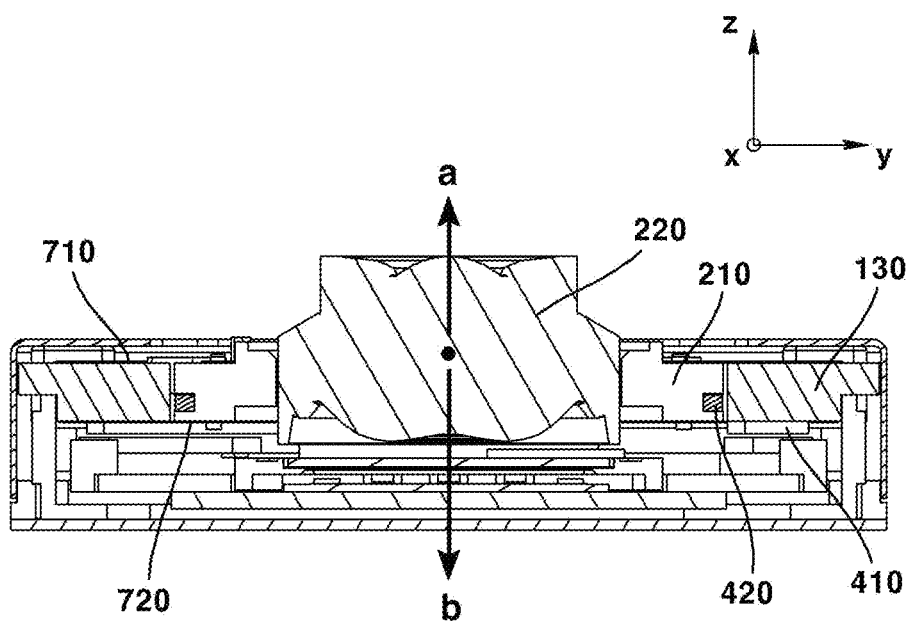
FIG. 26 is a view for explaining the operation of the autofocus function of a camera device according to the present embodiment.

FIG. 26 is a view for explaining the operation of the autofocus function of a camera device according to the present embodiment.

When a power source is applied to the first coil 430 of the camera device 10 according to the present embodiment, an electromagnetic field is formed in the first coil 430, and the first coil 430 may move in an optical axis direction (z-axis direction) through electromagnetic interaction with the driving magnet 410. At this time, the first coil 430 may move in an optical axis direction together with the first moving part 200 comprising the lens 220. In this case, since the lens 220 moves away from or closer to the image sensor 330, the focus of the subject may be adjusted. In order to apply a power source to the first coil 430, any one or more of a current and a voltage may be applied.

When a current in a first direction is applied to the first coil 430 of the camera device 10 according to the present embodiment, the first coil 430 moves in an upward direction of the optical axis direction through electromagnetic interaction with the driving magnet 410 (refer to a of FIG. 26). At this time, the first coil 430 may move the lens 220 in an upward direction of the optical axis direction to move it away from the image sensor 330.

When a current in a second direction opposite to the first direction is applied to the first coil 430 of the camera device 10 according to the present embodiment, The first coil 430 may move in a lower direction (refer to b of FIG. 26) of the optical axis direction through electromagnetic interaction with the driving magnet 410. At this time, the first coil 430 may move the lens 220 in a lower direction of the optical axis to be closer to the image sensor 330.

Figure 27:
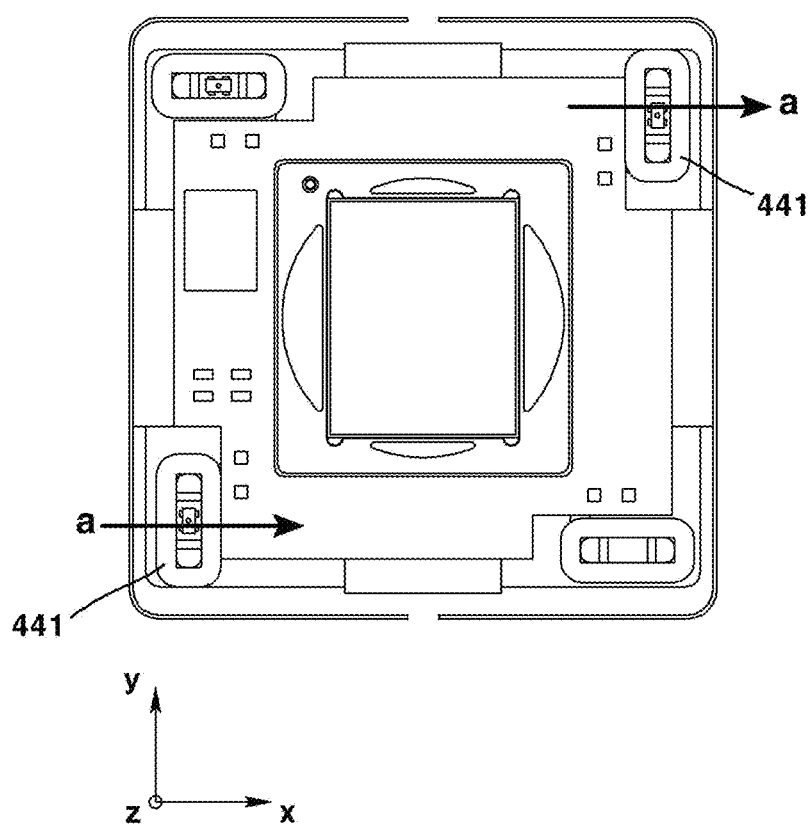
FIGS. 27 to 29 are diagrams for explaining the operation of the handshake correction function of a camera device according to the present embodiment. In more detail.
Figure 28:
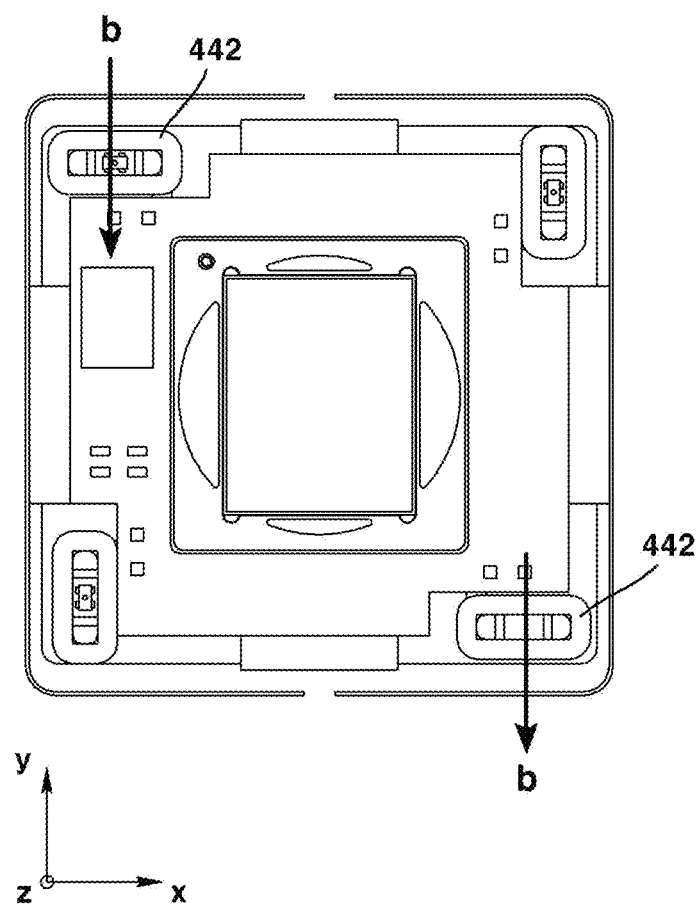
Figure 29:
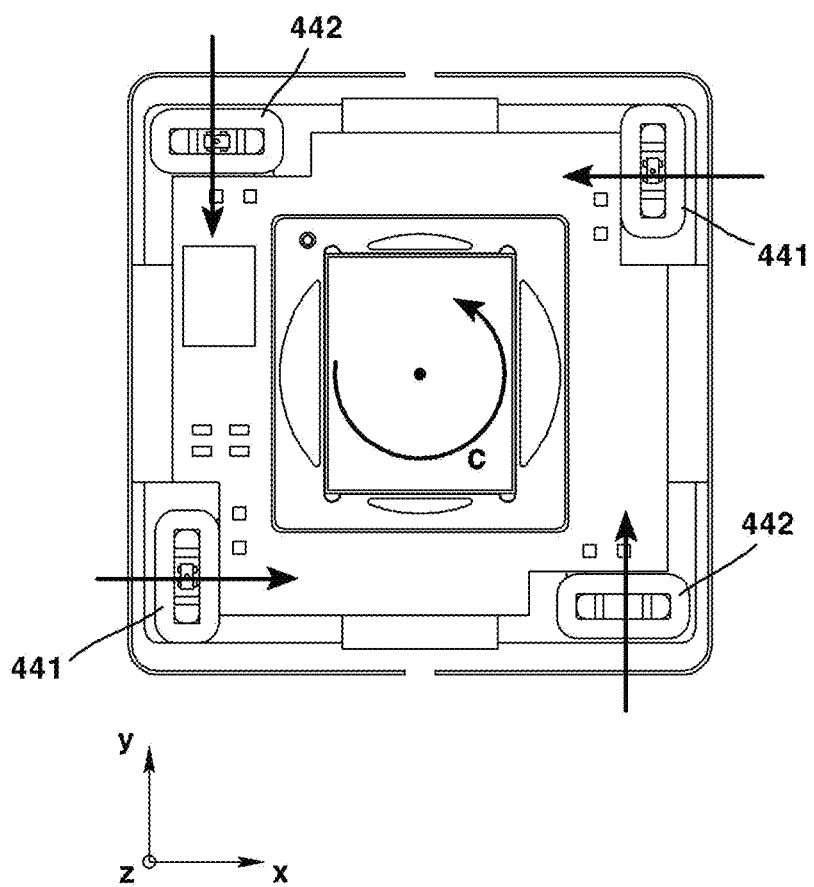

FIGS. 27 to 29 are diagrams for explaining the operation of the handshake correction function of a camera device according to the present embodiment.

When a power source is applied to the second coil 440 of the camera device 10 according to the present embodiment, an electromagnetic field is formed in the second coil 440 and the second coil 440 may move in a direction perpendicular to the optical axis direction through electromagnetic interaction with the driving magnet 410. In addition, the second coil 440 may rotate with respect to the optical axis through electromagnetic interaction with the driving magnet 410. At this time, the second coil 440 may move or rotate together with the second moving part 300 comprising the image sensor 330. In the present embodiment, the second coil 440 may move the image sensor 330 so that the shaking of the camera device 10 detected by the gyro sensor 490 is compensated.

FIG. 27 is a diagram for explaining driving in which the image sensor of the camera device according to the present embodiment is shifted along the x-axis.

When the current in a first direction is applied to the second-first coil 441 of the camera device 10 according to the present embodiment, the second-first coil 441 may move in one direction (refer to a of FIG. 27) of a first direction (x-axis direction) perpendicular to the optical axis direction through electromagnetic interaction with the driving magnet 410. At this time, the second-first coil 441 may move the image sensor 330 in one direction of a first direction perpendicular to the optical axis direction. Conversely, when a current in a second direction opposite to the first direction is applied to the second-first coil 441, the second-first coil 441 may move in the other direction of the first direction (x-axis direction) perpendicular to the optical axis direction through electromagnetic interaction with the driving magnet 410. At this time, the second-first coil 441 may move the image sensor 330 in the other of the first direction perpendicular to the optical axis direction.

FIG. 28 is a diagram for explaining driving in which an image sensor of a camera device according to the present embodiment is shifted along the y-axis.

When the current in a first direction is applied to the second-first coil 441 of the camera device 10 according to the present embodiment, the second-first coil 441 may move in one direction (refer to a of FIG. 27) of the first direction (x-axis direction) perpendicular to the optical axis direction through electromagnetic interaction with the driving magnet 410. At this time, the second-first coil 441 may move the image sensor 330 in one of the first directions perpendicular to the optical axis direction. Conversely, when a current in a second direction opposite to the first direction is applied to the second-first coil 441, the second-first coil 441 may move in the other direction of the first direction (x-axis direction) perpendicular to the optical axis direction through electromagnetic interaction with the driving magnet 410. At this time, the second-first coil 441 may move the image sensor 330 in the other of the first direction perpendicular to the optical axis direction.

FIG. 29 is a view for explaining the driving of an image sensor of a camera device according to the present embodiment is rolled around the z-axis.

When the current in the first direction is applied to the second-first coil 441 and the second-second coil 442 of the camera device 10 according to the present embodiment, the second-first coil 441 and the second-second coil 442 may rotate in one direction about the optical axis through electromagnetic interaction with the driving magnet 410 (refer to c of FIG. 29). At this time, the second-first coil 441 and the second-second coil 442 may rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 may rotate in other directions about the optical axis through electromagnetic interaction with the driving magnet 410. At this time, the second-first coil 441 and the second-second coil 442 may rotate the image sensor 330 in other direction about the optical axis. At this time, the other direction may be clockwise.

Hereinafter, an optical device according to the present embodiment will be described with reference to the drawings.

Figure 30:
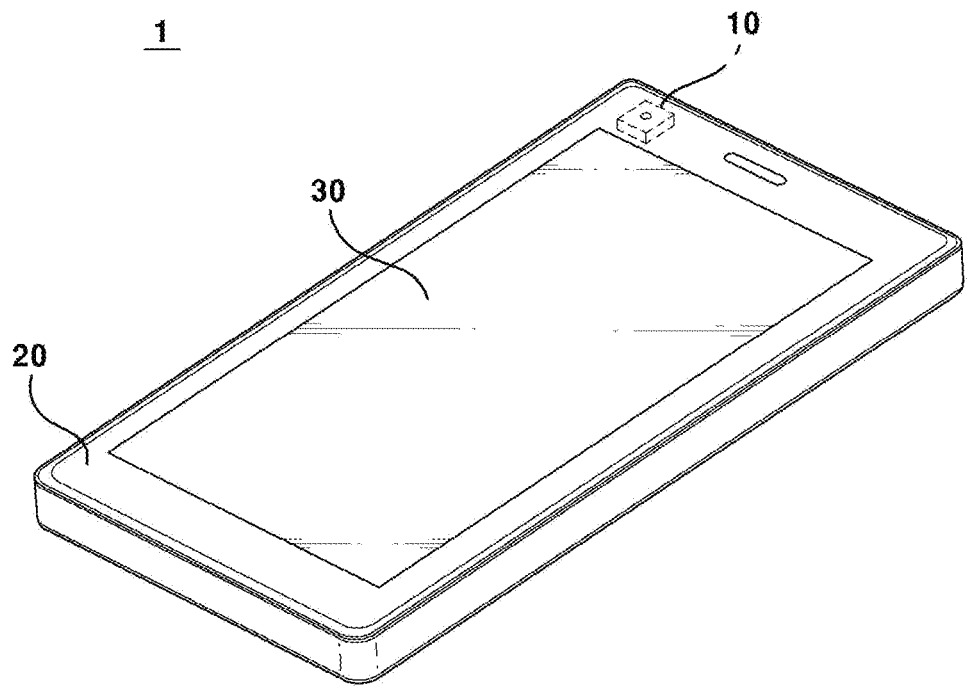
FIG. 30 is a perspective view of an optical device according to the present embodiment.
Figure 31:
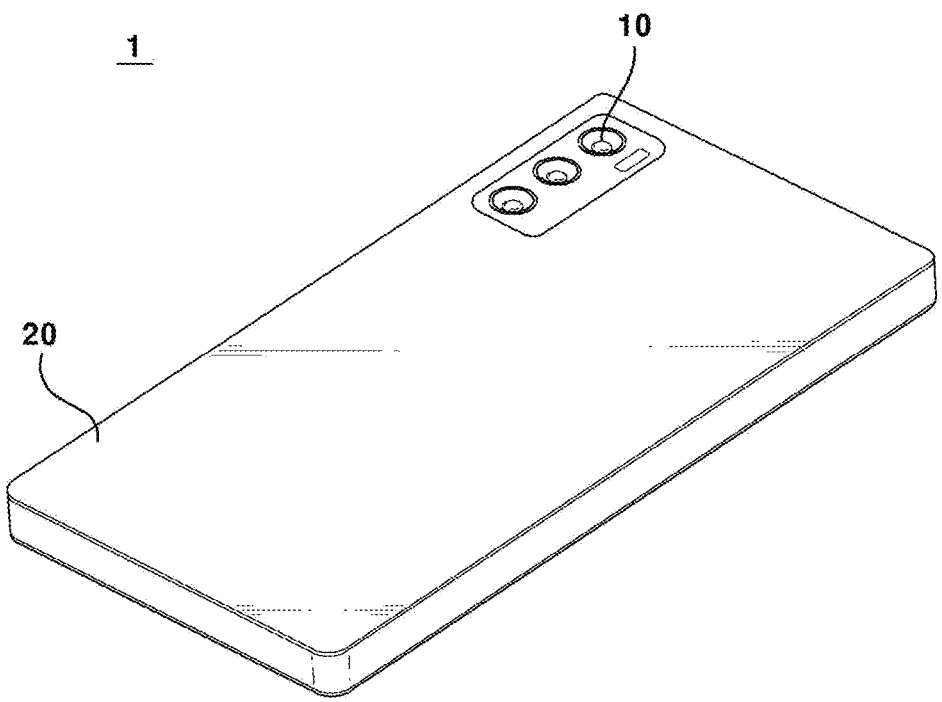
FIG. 31 is a perspective view of an optical device according to the present embodiment as viewed from a different direction from FIG. 30.

FIG. 30 is a perspective view of an optical device according to the present embodiment, and FIG. 31 is a perspective view of an optical device according to the present embodiment as viewed from a different direction from FIG. 30.

The optical device 1 may comprise any one or more among hand phone, portable phone, portable terminal, mobile terminal, smart phone, smart pad, portable smart device, digital camera, laptop computer, digital broadcasting terminal, personal digital assistants (PDA), portable multimedia player (PMP), and navigation. The optical device 1 may comprise any device for photographing an image or a picture.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed in the main body 20. The display 30 may output any one or more of a video and an image photographed by the camera device 10. The display 30 may be disposed on a first surface of the main body 20. The camera device 10 may be disposed on any one or more of a first surface of the main body 20 and a second surface opposite to the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a first substrate;
a base disposed on the first substrate;
a second substrate spaced apart from the first substrate;
an image sensor electrically connected to the second substrate;
a holder disposed on the second substrate;
a driving unit configured to move the image sensor in a direction perpendicular to an optical axis direction with respect to the first substrate; and
a connection substrate electrically connecting the first substrate and the second substrate,
wherein the connection substrate comprises a first part fixed to the holder, and a second part fixed to the base,
wherein the base comprises a protruding part protruding from an upper surface of the base, and
wherein the second part of the connection substrate is fixed to the protruding part of the base with an adhesive.

2. The camera device of claim 1, wherein the holder comprises a protruding part formed on an outer edge of an upper surface of the holder, and
wherein the first part of the connection substrate is fixed to the protruding part of the holder with an adhesive.

3. The camera device of claim 2, wherein the holder comprises a groove formed on an outer lateral surface of the protruding part of the holder, and
wherein at least a part of the adhesive is disposed in the groove of the holder.

4. The camera device of claim 1, wherein the holder comprises a groove formed on an outer edge of a lower surface of the holder, and
wherein the connection substrate comprises a third part disposed on the groove of the holder.

5. The camera device of claim 1, wherein the connection substrate comprises a connection part connected to the second substrate, an extension part extending from the connection part, and a terminal part extending from the extension part and comprising a terminal,
wherein the connection part comprises a portion disposed perpendicular to the optical axis direction, and
wherein each of the extension part and the terminal part comprises a portion disposed parallel to the optical axis direction.

6. The camera device of claim 5, wherein the first part of the connection substrate is formed on the extension part, and
wherein the second part of the connection substrate is formed on the terminal part.

7. The camera device of claim 5, wherein the connection part comprises a portion bent in the optical axis direction and fixed to the holder, and
wherein the extension part comprises a portion bent in the direction perpendicular to the optical axis direction.

8. The camera device of claim 1, wherein the connection substrate comprises first and second connection substrates spaced apart from each other, and
wherein the first and second connection substrates are symmetrically disposed with respect to an imaginary plane perpendicular to an outer side surface of the holder and the imaginary plane comprises an optical axis.

9. The camera device of claim 4, wherein at least a portion of the third part of the connection substrate is bent roundly.

10. A camera device comprising:
a first substrate;
a base disposed on the first substrate;
a second substrate spaced apart from the first substrate;
an image sensor electrically connected to the second substrate;
a holder disposed on the second substrate;
a driving unit configured to move the image sensor in a direction perpendicular to an optical axis direction with respect to the first substrate; and
a connection substrate electrically connecting the first substrate and the second substrate,
wherein the connection substrate comprises a first part fixed to the holder, and a second part fixed to the base,
wherein the holder comprises a protruding part formed on an outer edge of an upper surface of the holder, and
wherein the first part of the connection substrate is fixed to the protruding part of the holder with an adhesive.

11. The camera device of claim 1, wherein the holder comprises first and second side surfaces disposed opposite to each other, and third and fourth side surfaces disposed opposite to each other, and
wherein the connection substrate is fixed to the first and second side surfaces and spaced apart from the third and fourth side surfaces.

12. The camera device of claim 11, wherein the base comprises first and second side surfaces disposed at positions corresponding to the first and second side surfaces of the holder, and third and fourth sides disposed at positions corresponding to the third and fourth side surfaces of the holder; and wherein the connection substrate is fixed to the third and fourth side surfaces of the base and spaced apart from the first and second side surfaces of the base.

13. The camera device of claim 12, wherein the base comprises a protruding part extending upward from the first and second side surfaces of the base and disposed to be overlapped with an outer side of the connection substrate in a direction perpendicular to the optical axis direction.

14. The camera device of claim 2, wherein the driving unit comprises a coil disposed on an upper surface of the holder and a magnet disposed at a position corresponding with the coil.

15. The camera device of claim 1, comprising:
a lens disposed at a position corresponding with the image sensor;
a bobbin coupled with the lens; and
a coil and a magnet configured to move the lens in the optical axis direction.

16. The camera device of claim 1, wherein the first part of the connection substrate is contacted with the holder.

17. An optical device comprising:
a main body;
the camera device of claim 1 disposed on the main body; and
a display disposed on the main body and configured to output a video or an image photographed by the camera device.

18. The camera device of claim 10, wherein the holder comprises a groove formed on an outer lateral surface of the protruding part of the holder, and
wherein at least a part of the adhesive is disposed in the groove of the holder.

19. The camera device of claim 10, wherein the base comprises a protruding part protruding from an upper surface of the base, and
wherein the second part of the connection substrate is fixed to the protruding part of the base.

20. A camera device comprising:
a first substrate;
a base disposed on the first substrate;
a second substrate spaced apart from the first substrate;
an image sensor electrically connected to the second substrate;
a holder disposed on the second substrate;
a driving unit configured to move the image sensor in a direction perpendicular to an optical axis direction with respect to the first substrate; and
a connection substrate electrically connecting the first substrate and the second substrate,
wherein the connection substrate comprises a first part fixed to the holder, and a second part fixed to the base,
wherein the holder comprises a groove formed on an outer edge of a lower surface of the holder, and
wherein the connection substrate comprises a third part disposed on the groove of the holder.

* * * * *